US008708267B2

(12) United States Patent
Morgan

(10) Patent No.: US 8,708,267 B2
(45) Date of Patent: Apr. 29, 2014

(54) DEVICE AND METHOD FOR A ROLLING A SHEET OF MATERIAL FOR PACKAGING, STORAGE, SHIPMENT, AND DISPENSING

(75) Inventor: Wayne S. Morgan, Soquel, CA (US)

(73) Assignee: Wayne S. Morgan, Soquel, CA (US)

( * ) Notice: Subject to any disclaimer, the term of this patent is extended or adjusted under 35 U.S.C. 154(b) by 698 days.

(21) Appl. No.: 12/828,900

(22) Filed: Jul. 1, 2010

(65) Prior Publication Data

US 2012/0001013 A1    Jan. 5, 2012

(51) Int. Cl.
*B65H 18/28*    (2006.01)

(52) U.S. Cl.
USPC ..................................... 242/160.4; 242/598.3

(58) Field of Classification Search
USPC ............. 242/160.1, 160.3, 160.4, 596, 596.8, 242/598, 598.3, 598.5
See application file for complete search history.

(56) References Cited

U.S. PATENT DOCUMENTS

| | | | |
|---|---|---|---|
| 3,537,688 A | 11/1970 | Stein | |
| 3,865,325 A * | 2/1975 | Newcomer, Jr. | 242/160.3 |
| 4,148,441 A * | 4/1979 | Cohen | 242/160.4 |
| 5,029,819 A | 7/1991 | Kane | |
| 5,318,235 A * | 6/1994 | Sato | 242/571 |
| D376,636 S | 12/1996 | Betz | |
| 5,667,165 A * | 9/1997 | Gardner | 242/588.2 |
| 5,865,355 A | 2/1999 | Camara | |
| 5,937,883 A | 8/1999 | Camara | |
| 6,092,792 A | 7/2000 | Camara | |
| 6,158,192 A * | 12/2000 | Gardner | 242/596.1 |
| 6,264,570 B1 | 7/2001 | Yoon | |
| 7,007,326 B2 * | 3/2006 | Tsiarkezos | 5/497 |
| 7,175,548 B2 | 2/2007 | McNulty | |
| 2002/0155237 A1 * | 10/2002 | Allard | 428/36.1 |
| 2005/0098770 A1 | 5/2005 | Schell | |

* cited by examiner

*Primary Examiner* — William A Rivera
(74) *Attorney, Agent, or Firm* — Landmark Intellectual Property Law, PC

(57) ABSTRACT

A method and device for handling and deploying a sheet of material are provided. In a first version, a rigid rod is positioned within a flexible cylindrical core and the sheet is wrapped around the core. The rod is then removed from the core and the core and sheet may be folded and reshaped for storage or shipment. The core and sheet may then be unfolded and the sheet may be unwrapped from the core. The rigid rod may be positioned within the core after the core is unfolded and to enable easier removal of the sheet from the core. A dispenser may be provided that attaches to the core and/or the rod and enables an operator to unwrap the sheet from the core. The core may be sufficiently rigid to allow the dispenser to be coupled with the core and without positioning of a rigid rod within the core.

17 Claims, 28 Drawing Sheets

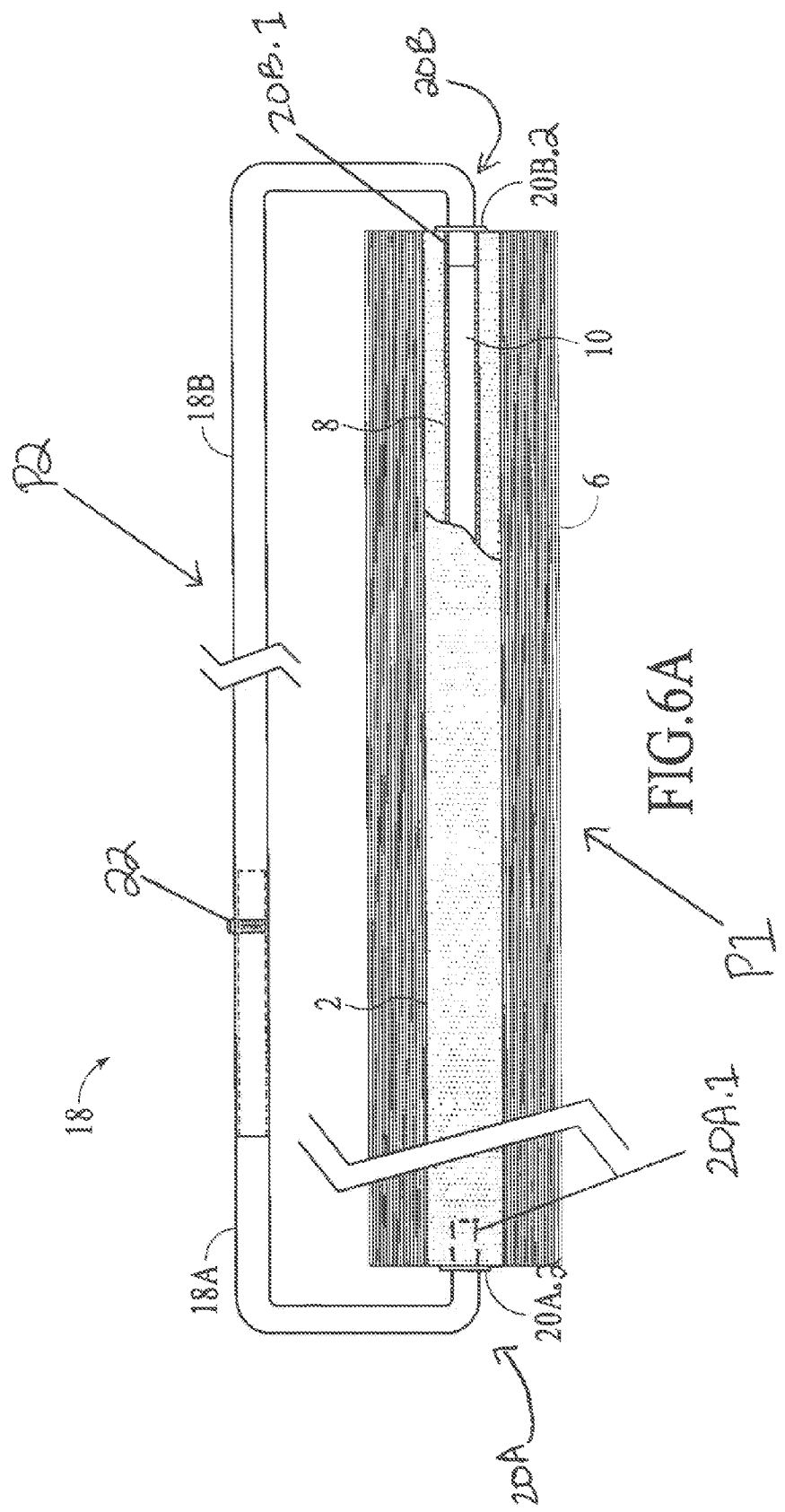

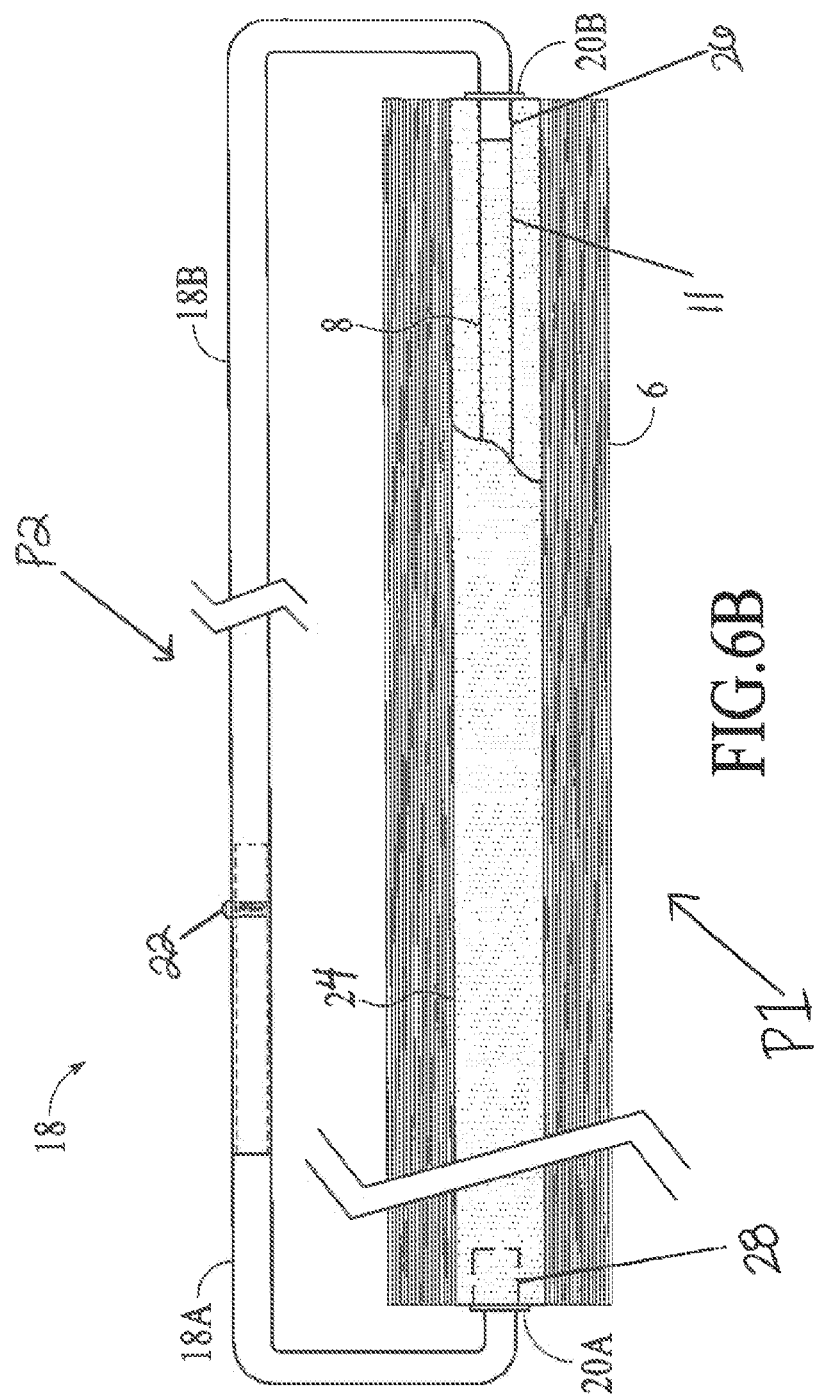

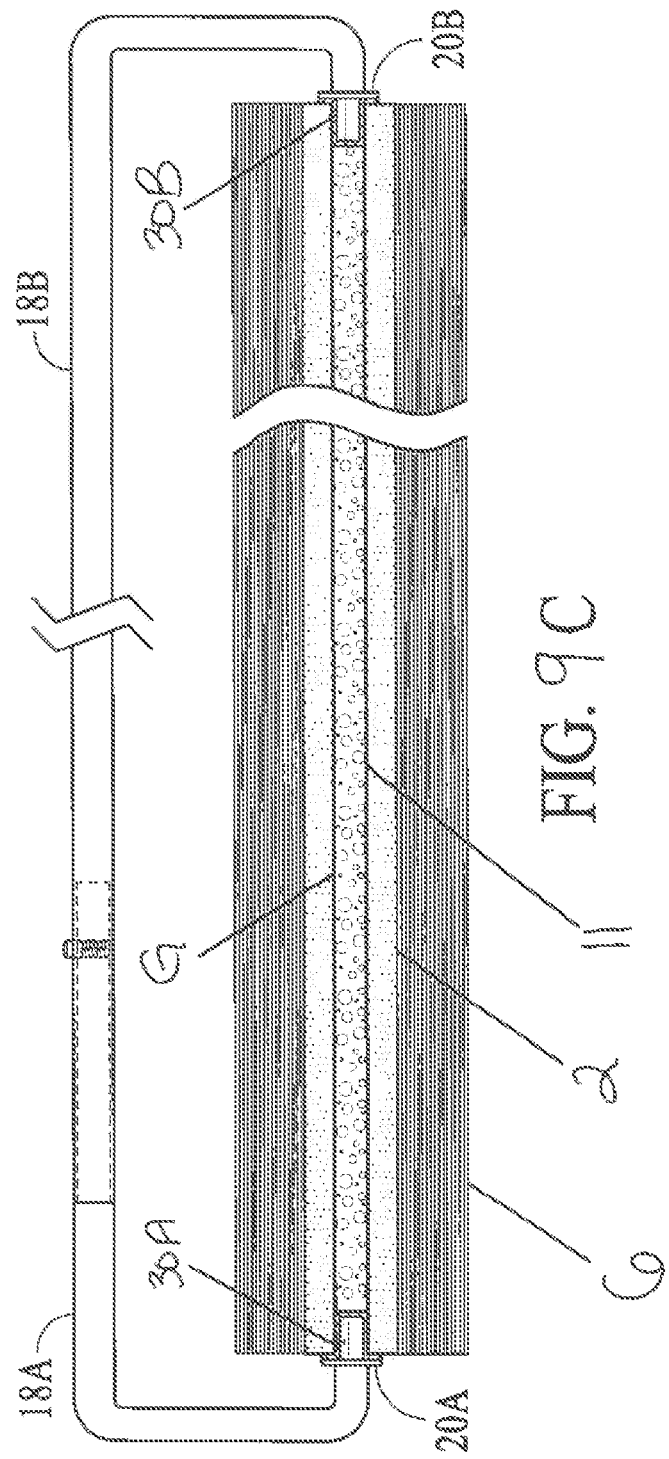

DEVICE AND METHOD FOR A ROLLING A SHEET OF MATERIAL FOR PACKAGING, STORAGE, SHIPMENT, AND DISPENSING

FIELD OF THE INVENTION

The present invention relates to the field of handling rolled sheets of material. More particularly, the method of the present invention relates to storing, shipping, dispensing, unrolling and deploying rolled sheets of material.

BACKGROUND OF THE INVENTION

Sheet materials, such as textiles, paper, tarpaulin, canvas, flexible plastics, fencing materials, flexible solar energy conversion circuitry panels, often have surface areas that extend for dozens or hundreds of square feet. Where the surface area of a deployed sheet is defined as extending in a width dimension that is orthogonal to a length dimension, prior art sheets include sheets having widths greater than six feet and lengths longer than ten feet.

Sheet materials are often packed for shipment by folding into flat layered sections and in some cases then rolled after this flattened folding. In an optional additional step, the sheet material may be wrapped about an axis that is parallel with the width dimension of the instant sheet in order to package and ship the sheet material with a reduced maximum length in any one dimension. In certain cases, consumers and business purchasers of sheet material would prefer to dispense and deploy sheet material by a single action of rolling out the sheet material from a rolled state. The extension and dispensing of the packaged sheet material from a rolled state is made more difficult when the material is received by the consumer (a.) folded into flattened layers, or (b.) folded into flattened layers and then rolled in this layered state.

As used herein, the terms "sheet material" and "sheet" mean a material that is thin in comparison to its length and breadth. For example, certain sheet materials may be less than 0.20 inch thick, or less than 0.01 inch thick, while presenting a surface area that is several feet in width and several feet in length. Generally speaking, sheet materials should exhibit a relatively flat planar configuration and be flexible to permit folding, rolling, stacking, and the like. Exemplary sheets and sheet materials include, but are not limited to, flexible materials such as a netting, elastomer netting, deer netting, tarpaulin, canvas, fencing materials, barrier materials, plant protection materials, organic fabric, textile, cloth, metallic threaded fabric, aramid fiber, polyester film, elastomer sheet, metallic foil, metallic film, paper tissue, paper towels, label rolls, or other fibrous, film, flexible solar energy conversion circuitry panels, polymers, and filamentary products. As can be seen from the breadth of materials that sheet materials may comprise, materials shaped into sheets are widely used in agricultural, agrarian, domestic, and urban environments. Yet the prior art fails to optimally enable reconfiguration of the form factor of rolled sheets while also protecting the sheet material.

It is understood that the scope of meaning of the term "flexible solar energy conversion circuitry panel" as used herein is defined to include (1.) a thin film solar panel marketed by Nanosolar Corporation of San Jose, Calif. and (2.) a thin film solar panel marketed by First Solar Corporation of Tempe, Ariz. It is further understood that the scope of meaning of the term "netting" as used herein is defined to include one or more sheets of polyethylene mesh, trellis netting, a Ross Deer Netting™ deer netting material, a sheet of Wild Life Netting™, a Burpee Garden™ trellis netting marketed by W. Atlee Burpee and Co. of Warminster, Pa., and other suitable flexible netting known in the art.

There is therefore a long felt need to provide methods and devices that more broadly enable the placement of sheet material into a rolled state for storage and shipment, and for dispensing and deploying sheet material from a rolled state.

SUMMARY OF THE INVENTION

This and other objects of the present invention are made obvious in light of this disclosure, wherein a method and device for configuring the shape of rolled sheet material is presented. In a first preferred embodiment, a flexible cylindrical core presents an inner channel that extends along a longitudinal axis of the core. A rigid member is removably positioned within the core inner channel and a flexible sheet is then wrapped around an external curved surface of the core. After the sheet is wrapped around the core, the rigid member is removed form the core inner channel and the core and sheet are folded along the core longitudinal axis.

The core and sheet may then be unfolded and the same rigid member, or another rigid member, may be placed into the inner channel, and the sheet may be unwrapped and detached from the core.

According to an additional aspect of the method of the present invention, a handling tool may be provided that couples with at least one end of the rigid member. The handling tool may optionally be rotatably coupled with the rigid member, whereby the rigid member may be rotatable while coupled with the handling tool. The sheet may be unwrapped from the core while the rigid member is coupled with the handling tool.

According to another additional aspect of the method of the present invention, the folded core and sheet may be maintained in a certain shape by restraints and optionally placed within a container or protective covering for storage and shipment.

According to another additional aspect of the method of the present invention, the inner channel may be filled with a pressurized gas or gas mixture, such as air, to support the integrity of the extended shape of the core and sheet when the care is unwrapped from a folded state and returned to an extended shape. The core may optionally include an inner channel surface layer that supports the maintenance of the gas in a pressurized state within the inner channel.

According to yet another additional aspect of the method of the present invention, the sheet may be unwrapped from the core in the extended shape without deploying a rigid member within the inner channel of the core.

The foregoing and other objects, features and advantages will be apparent from the following description of aspects of the present invention as illustrated in the accompanying drawings.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations by reference include US Patent Application Publication No. 20050098770 (Inventor: Schell); U.S.

Pat. No. 6,092,792 (Inventor: Camara); U.S. Pat. No. 5,937,883 (Inventor: Camara); U.S. Pat. No. 5,865,355 (Inventor: Camara); U.S. Pat. No. 6,264,570 (Inventor: Yoon); U.S. Pat. No. 5,029,819; (Inventor: Kane); U.S. Pat. No. 3,537,688 (Inventor: Stein); U.S. Pat. No. 7,175,548 (Inventor: McNulty); and U.S. Pat. No. D376,636 (Inventor: Betz).

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of various aspects of the present invention may be better understood with reference to the accompanying specification, wherein:

FIG. 6A is a front cut-away view of a dispenser engaged with the rod of FIG. 4 thereby coupled with the flexible core of FIGS. 1 through 5B;

FIG. 6B is a front cut-away view of the dispenser of FIG. 6A engaged directly with an alternate flexible core;

FIG. 9C is a front cut-away representation of the flexible core of FIGS. 1 and 9A-9B and illustrating both hermetically sealing plugs inserted into the flexible core while maintaining the gas of FIG. 9B under pressure within the inner channel of the flexible core.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events. Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
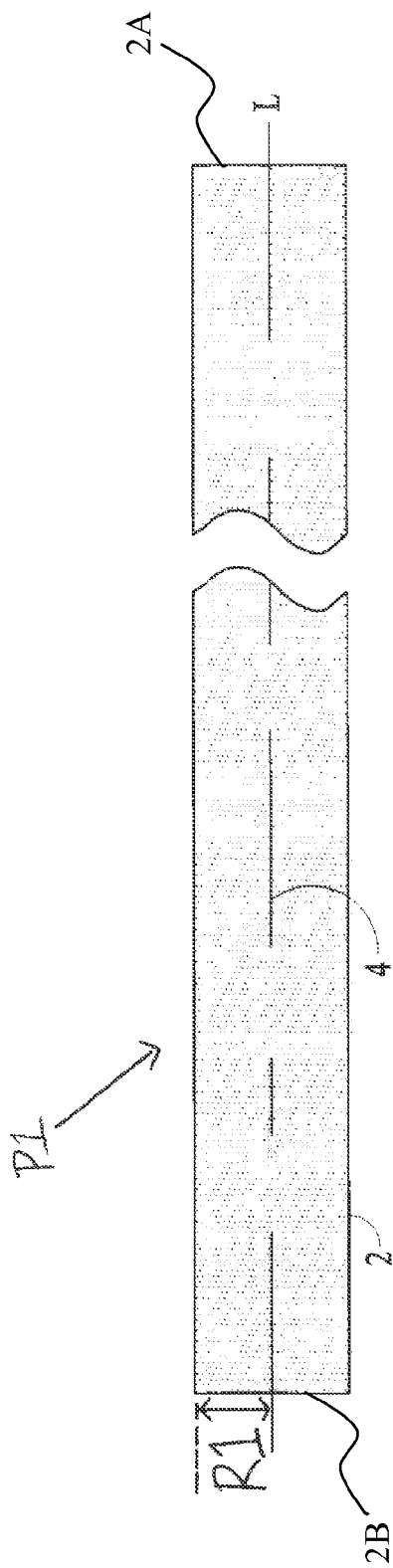
FIG. 1 is a cut-away front view of a flexible cylindrical core having an inner channel along a longitudinal access.
Figure 2:
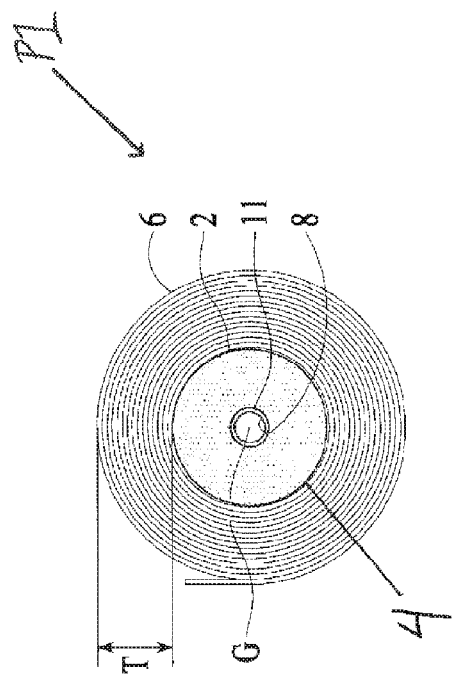
FIG. 2 is a side view of the flexible cylindrical core of FIG. 1 with a sheet of material wrapped around an external surface of the flexible cylindrical core.

Referring now generally to the Figures and particularly to FIGS. 1 and 2, FIG. 1 is a front view of an exemplary flexible cylindrical core 2 ("flexible core" 2) positioned in a first extended position P1 in parallel with a longitudinal axis L. The flexible core 2 extends for seven feet from a first end 2A to a second end 2B along the longitudinal access L and has an outer radius R1 of one inch. A curved outer surface 4 of the flexible core 2 has a circular cross-section positioned along the one inch outer radius R1 from the longitudinal axis L. The flexible core 2 may be or comprise, but not limited to, plumbing insulation, closed or open cell polymer foam, polyethylene closed cell foam or polyethylene open cell foam, KFLEX™ insulation 56C THERMACEL™ pipe insulation as marketed by NOMACO of Zebulon, N.C., or other suitable flexible material known in the art.

FIG. 2 presents a side view of the flexible core 2 with a unified sheet 6 wrapped around the curved outer surface 4, wherein the unified sheet 6 forms a sheet layer thickness T of approximately one inch plus or minus 0.25 inches extending from outer surface 4 of the flexible core 2.

Figure 8:
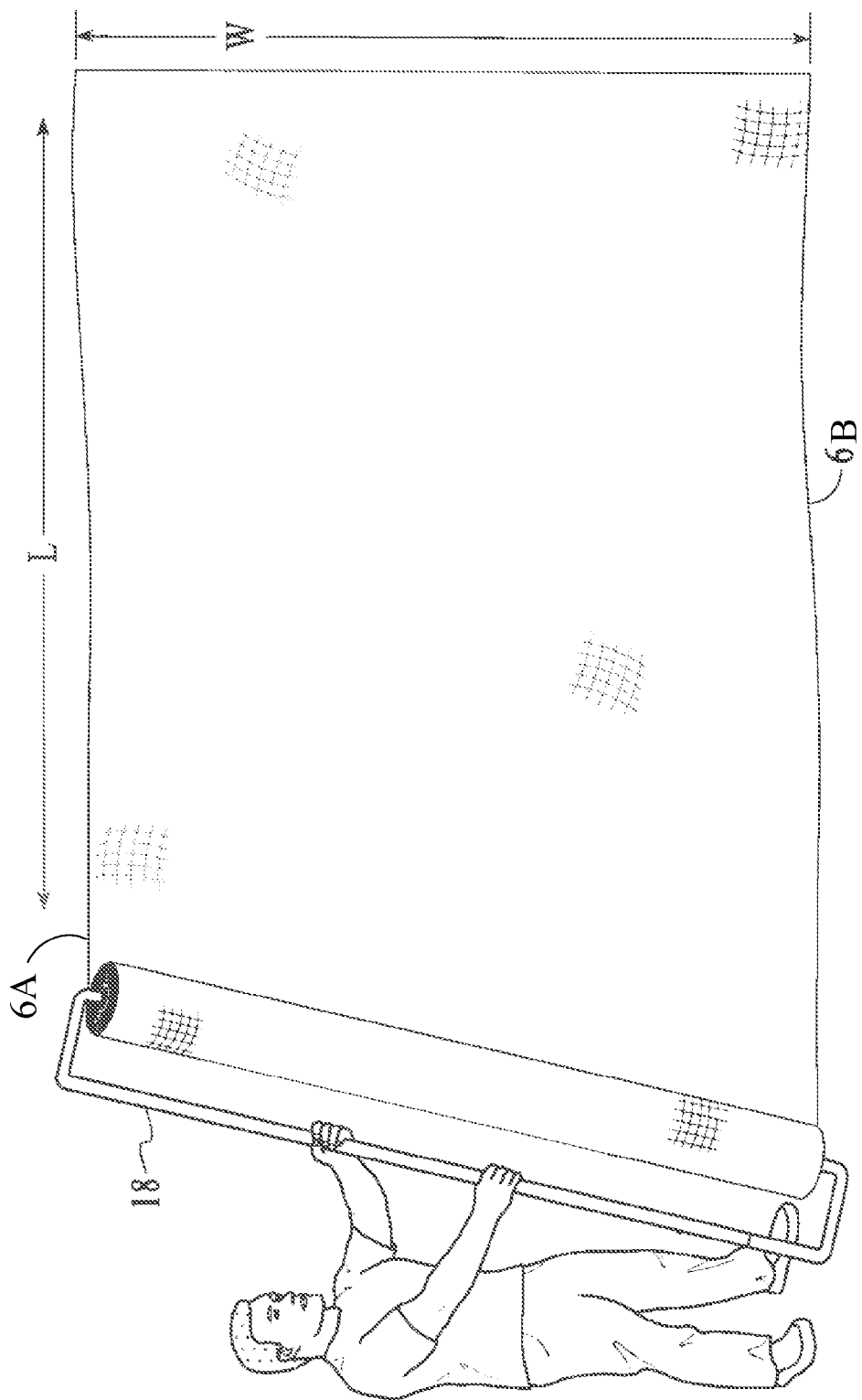
FIG. 8 is a perspective view of a human operator manually positioning the dispenser of FIGS. 6A-6C and 7A-7C and applied to roll out the sheet of FIGS. 2 through 8 while the dispenser is coupled with (a.) the rod of FIG. 4, (b.) the flexible core of FIG. 1 while maintaining a gas under pressure within the core inner channel, or (c.) the alternate flexible core of FIG. 6B.

The unified sheet 6 is a sheet material having at least two parallel sides 6A & 6B, as shown in FIG. 8, that may be or comprise a netting, a deer netting, a plant protection sheet, a fabric, a textile, a cloth, a tarpaulin, a canvas, a netting, a metallic threaded fabric, an aramid fiber sheet, a flexible solar energy conversion circuitry panel, a polyester film, an elastomer sheet, and an elastomer netting.

Figure 4:
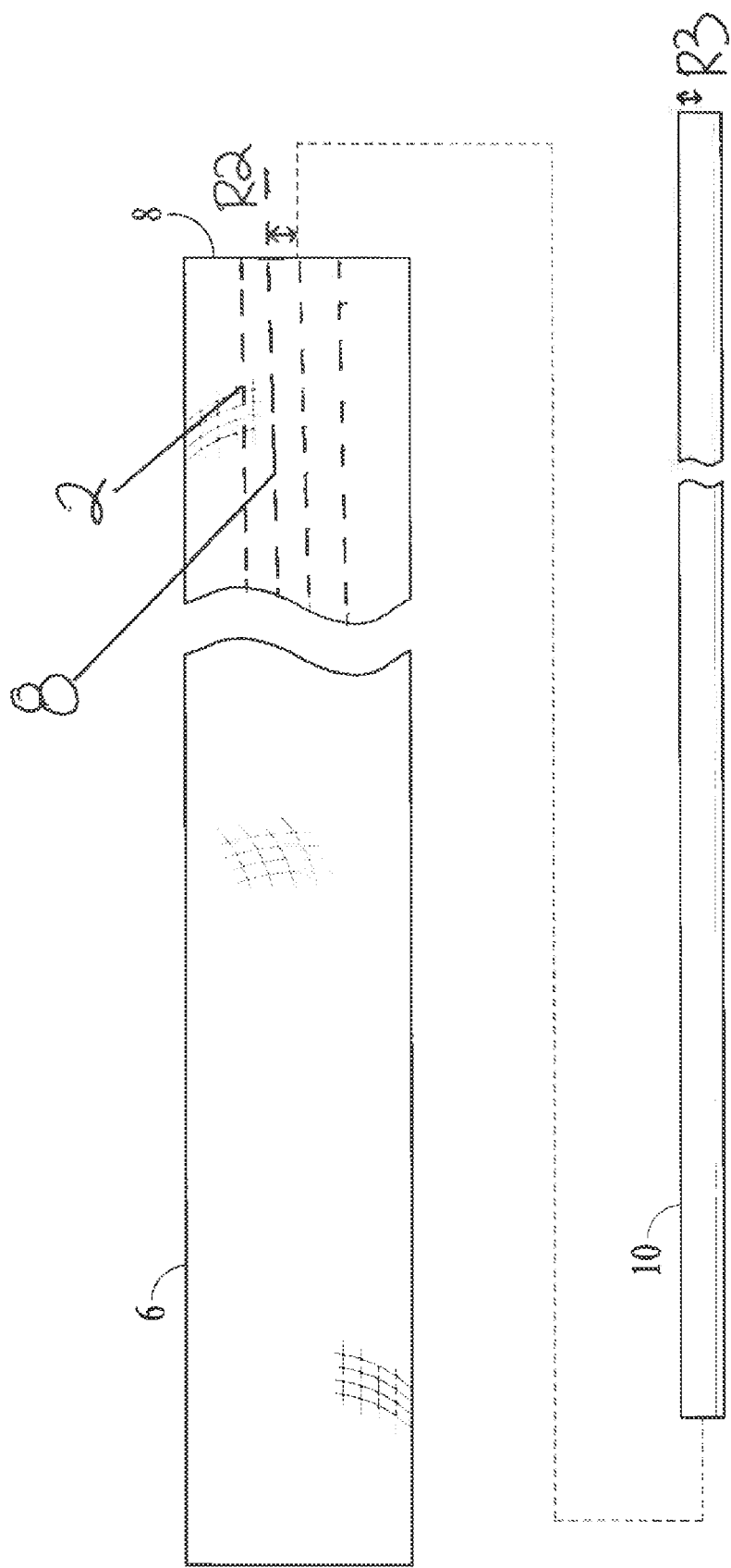
FIG. 4 is a front view of the sheet of material and flexible cylindrical core of FIGS. 1, 2 and 3 in combination with a rigid rod that may be removably inserted into the inner channel of the flexible cylindrical core.

An inner channel 8 of the flexible core 2 extends fully through the flexible core 2 about the longitudinal axis L when the flexible core 2 and the unified sheet 6 are placed in the first extended position P1. The inner channel 8 is sized to accept a rigid member 10 (as shown in FIG. 4). The inner channel 8 allows the rigid member 10 to removably pass through the flexible core 2, as per FIG. 4. An optional inner channel surface layer 11 of the flexible core 2 enables the flexible core 2 to maintain a pressurized gas G within the inner channel 8. The inner channel surface layer 11 may be or comprise a flexible tubing of organic or synthetic rubber or other suitable flexible hermetically sealing material known in the art. The inner channel surface layer 11 preferably presents a thickness along the direction of the outer radius R1 of from 0.01 inch to 0.10 inch.

Figure 3:
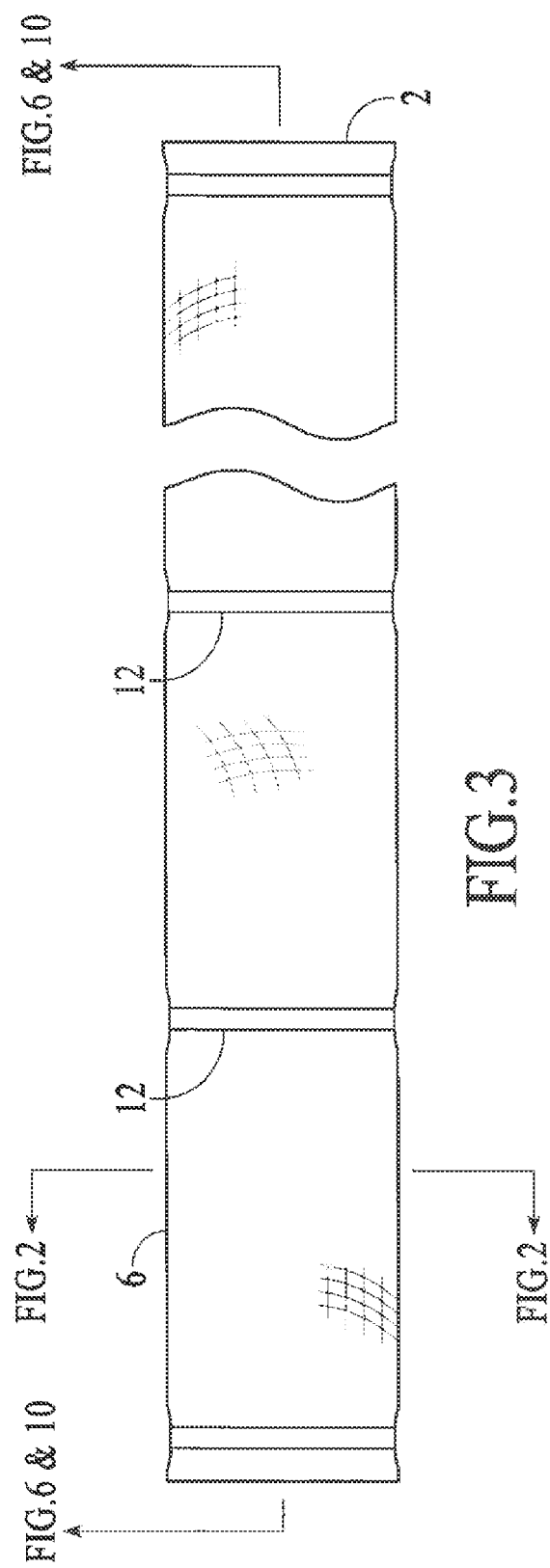
FIG. 3 is a front view of the sheet of material wrapped around the external surface of the flexible cylindrical core of FIGS. 1 and 2 and maintained in position relative to the flexible cylindrical core by a plurality of restraints.

Referring now generally to the Figures and particularly to FIG. 3, FIG. 3 is a front view of the unified sheet 6 wrapped about the flexible core 2 and secured to the flexible core 2 by a plurality of restraints 12. One or more restraints 12 may be or comprise a fiber string, a detachable strap, an elastic band, an organic or synthetic rubber band, or other suitable restraints known in the art.

Referring now generally to the Figures and particularly to FIG. 4, FIG. 4 is a front view of the core 2 and the rigid member 10 ("rod" 10). The rod 10 is sized to detachably fit into the core inner channel 8 and extend through and into the flexible core 2. For example, the inner channel 8 may have an inner diameter R2 of 0.51 inches and the rod 10 R3 may have an outer diameter of 0.50 inches. The rod 10 may be or comprise aluminum or other rigid metal alloy, or alternatively a hard plastic, or other suitable rigid material known in the art.

Figure 5A:
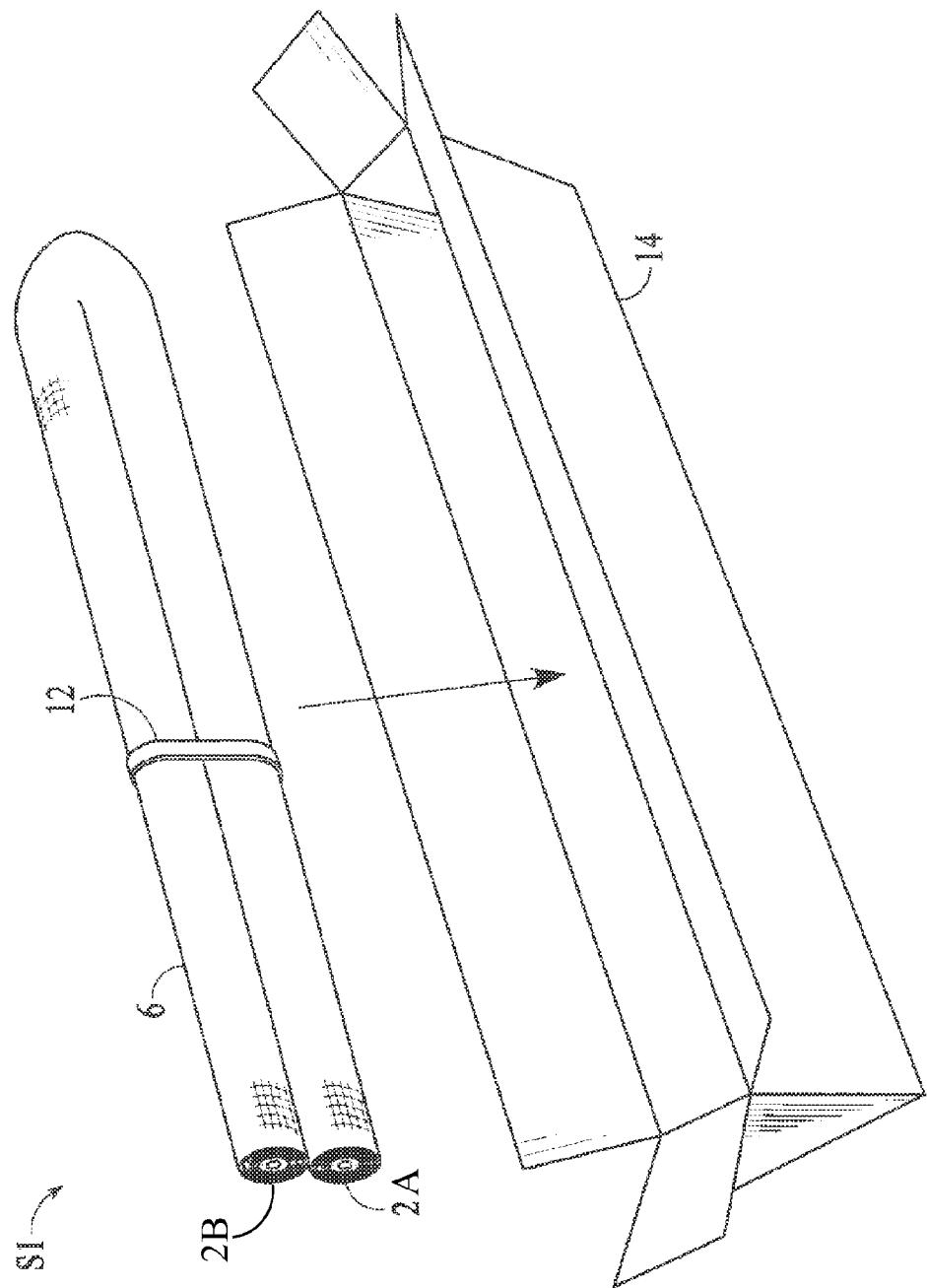
FIG. 5A is a perspective view of the sheet of material and flexible cylindrical core of FIGS. 1 through 4 folded once along a longitudinal axis and optionally bound by at least one restraint into a first folded shape for insertion into a first box.
Figure 5B:
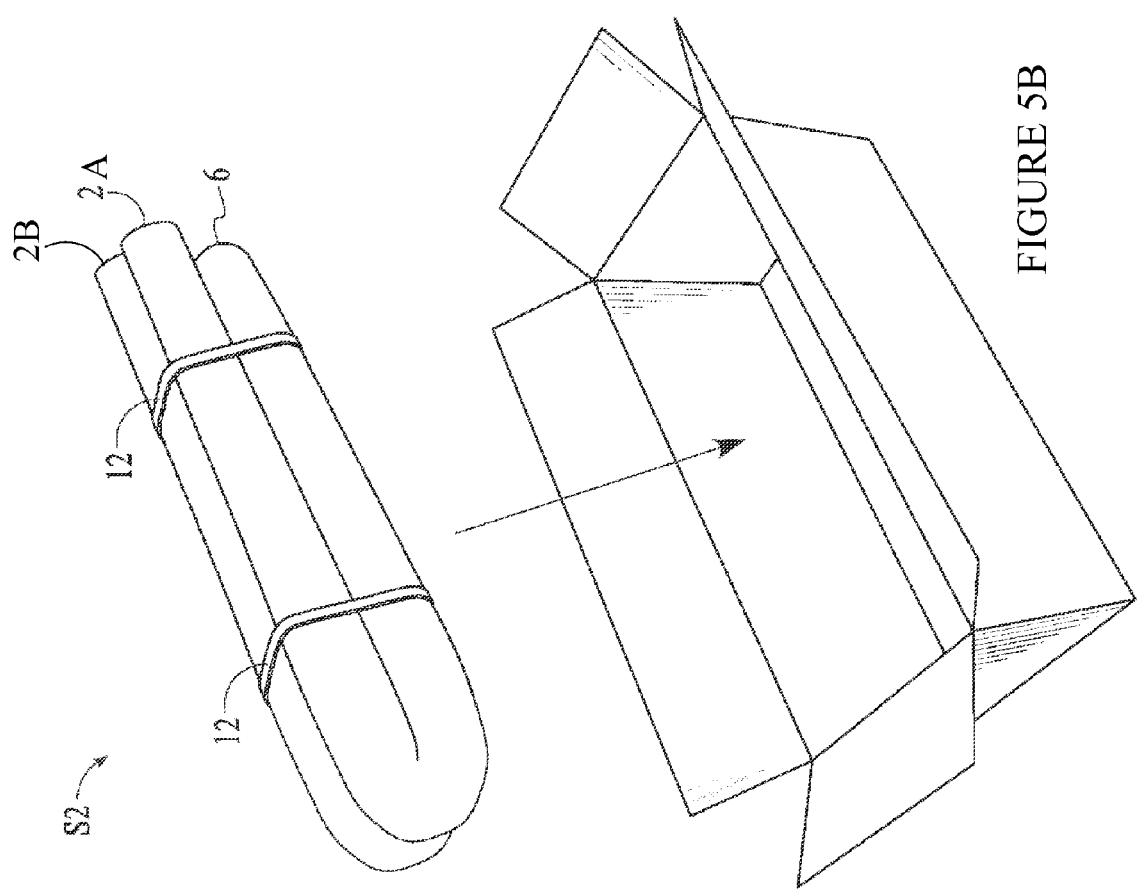
FIG. 5B is a perspective view of the sheet of material and flexible cylindrical core of FIGS. 1 through 4 folded three times along a longitudinal axis and optionally bound by at least one restraint into a second folded shape for insertion into a second alternate box.

Referring now generally to the Figures and particularly to FIGS. 5A and 5B, FIG. 5A is a perspective view of the flexible core 2 and sheet 6 in combination and folded once to form a first optional folded shape S1. The flexible core 2 and sheet 6 are optionally maintained in the first folded shape S1 by one or more restraints 12. The flexible core 2 and sheet 6 are shaped in the first folded shape S1 to fit into a first shipping box 14. Referring now to FIG. 5B, FIG. 5B is a perspective view of the flexible core 2 and sheet 6 in combination and folded twice to form a second optional folded shape S2. The flexible core 2 and sheet 6 are optionally maintained in the second folded shape S2 by two or more restraints 12. The flexible core 2 and sheet 6 are shaped in the second folded shape S2 to fit into a second shipping box 16.

Figure 6C:
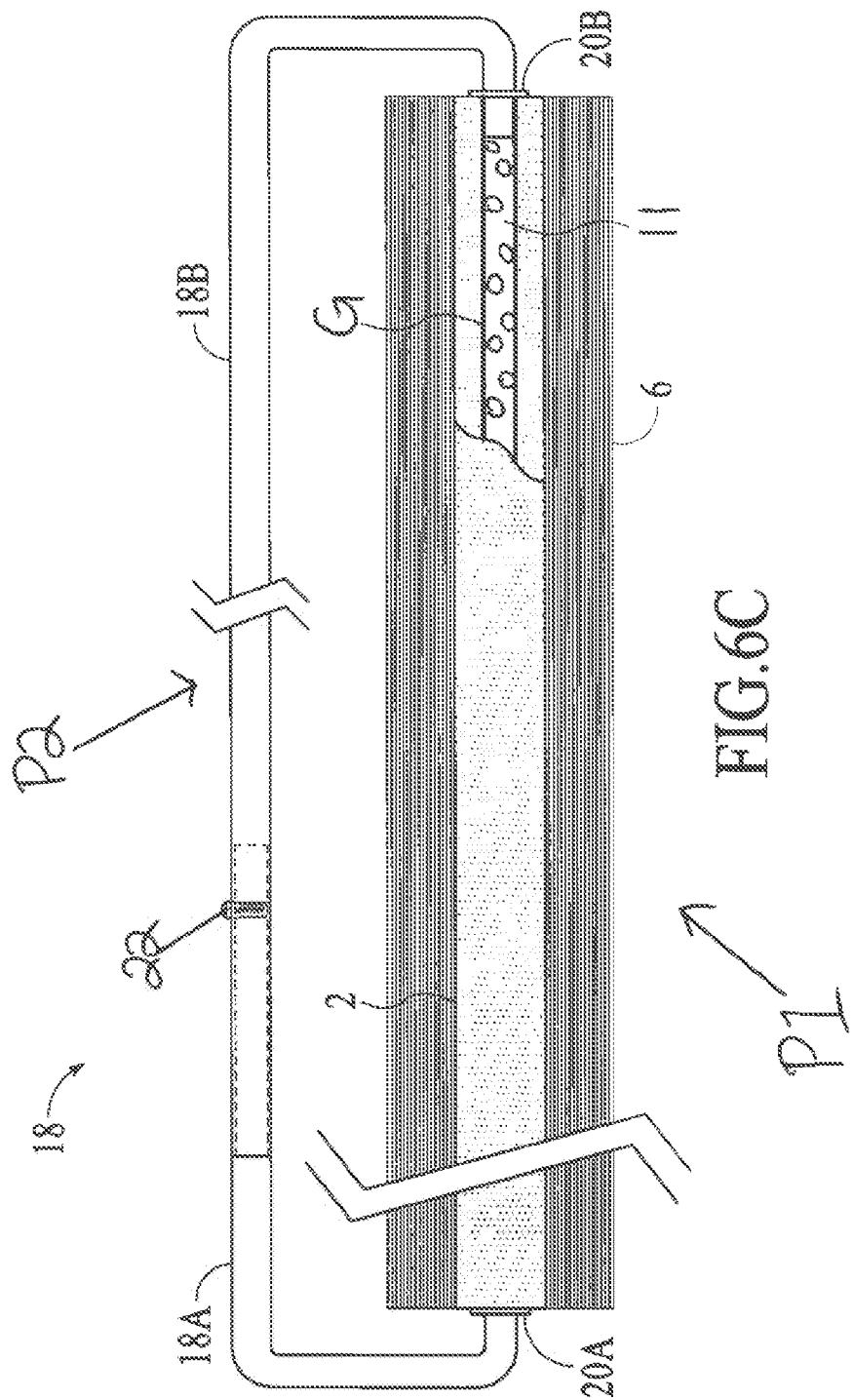
FIG. 6C is a front cut-away view of the dispenser of FIG. 6A engaged with the flexible core of FIGS. 1 through 5B, wherein a gas is maintained under pressure within the inner channel of the flexible core.

Referring now generally to the Figures and particularly to FIGS. 6A, 6B and 6C, FIG. 6A is a front cut-away view of a dispenser 18 engaged with the rod 10 and thereby coupled with the flexible core 2. The rod 10 is positioned within the inner channel 8. The inner channel surface layer 11 may optionally be configured to further protect an alternate resilient core 24 from wear and tear and enable an easier insertion of the rod 10 into the inner channel 8.

The dispenser includes two arms 18A and 18B, wherein a first arm 18A is shaped to partially and removably insert into a second arm 18B to position a first coupling end 20A of the first arm 18A and a second coupling end 20B of the second arm 18B. Each coupling end 20A and 20B forms a detachable friction fit with the rod 10. A spring loaded pin assembly 22 retains the first arm 18A and the second arm 18B in a dispensing position P2. A pin 22A of the pin assembly 22 is forced from the first arm 18A and through a pin aperture 22C of the second arm 18B by a spring 22B of the pin assembly 22 to maintain the dispenser 18 in the dispensing position P2. A human operator may disengage the first arm 18A from the second arm 18B by manually depressing the pin 22A fully through the pin aperture 22C of the second arm 18B, toward the first arm 18A and fully through the second arm 18B.

FIG. 6B is a front cut-away view showing the dispenser 18 engaged directly with the alternate resilient core 24. The resilient core 24 is comprised of a resilient material that independently resumes the first extended position P1 to enable dispensing of the unified sheet 6 without need of the rod 10 or pressurized gas G. The resilient core 24 may be or comprise resilient materials including, but not limited to, a resilient open cell or resilient closed cell foam, such as Polyethylene (PE) foam, Polyurethane (PU) foam, Ethylene vinyl acetate (EVA) foam, Silicone rubber foam, Latex rubber foam, or other suitable resilient materials known in the art. Resiliency of the resilient core 24 can be varied or selected by the choice of material, molecular weight, porosity and density of foam, and, for some materials (e.g. PE and EVA), and a degree of cross-linking thereof. The resilient core 24 preferably exhibits a degree of resiliency that caused the resilient core 24 to return to the first extended position P1 upon removal of restraints 12 or in transition from the first folded shape S1 and the second folded shape S2 without application of external force.

The dispenser 18 may be placed in the dispensing position P2 and coupled with the alternate resilient core 24. The resilient core 24 may optionally include an inner channel 8 that is included in the design of the flexible core 2. The optional inclusion of the inner channel 8 in the design of the alternate resilient core 24 allows a human operator to have the option to employ the rod 10 in combination with the alternate resilient core 24. The inner channel surface layer 11 may optionally be included in the design of the alternate resilient core 24 to further protect the alternate resilient core 24 from wear and tear.

FIG. 6C is a front cut-away view of the dispenser 18 that forms a hermetic seal with the flexible core 2 and maintains a pressurized gas G within the inner channel 8. The pressurized gas G maintains the flexible core 2 in the first extended position P1. The inner channel surface layer 11 may optionally be included in the design of the alternate resilient core 24 to further provide a hermetic seal to maintain the gas G under pressure within the inner channel 8.

Figure 7A:
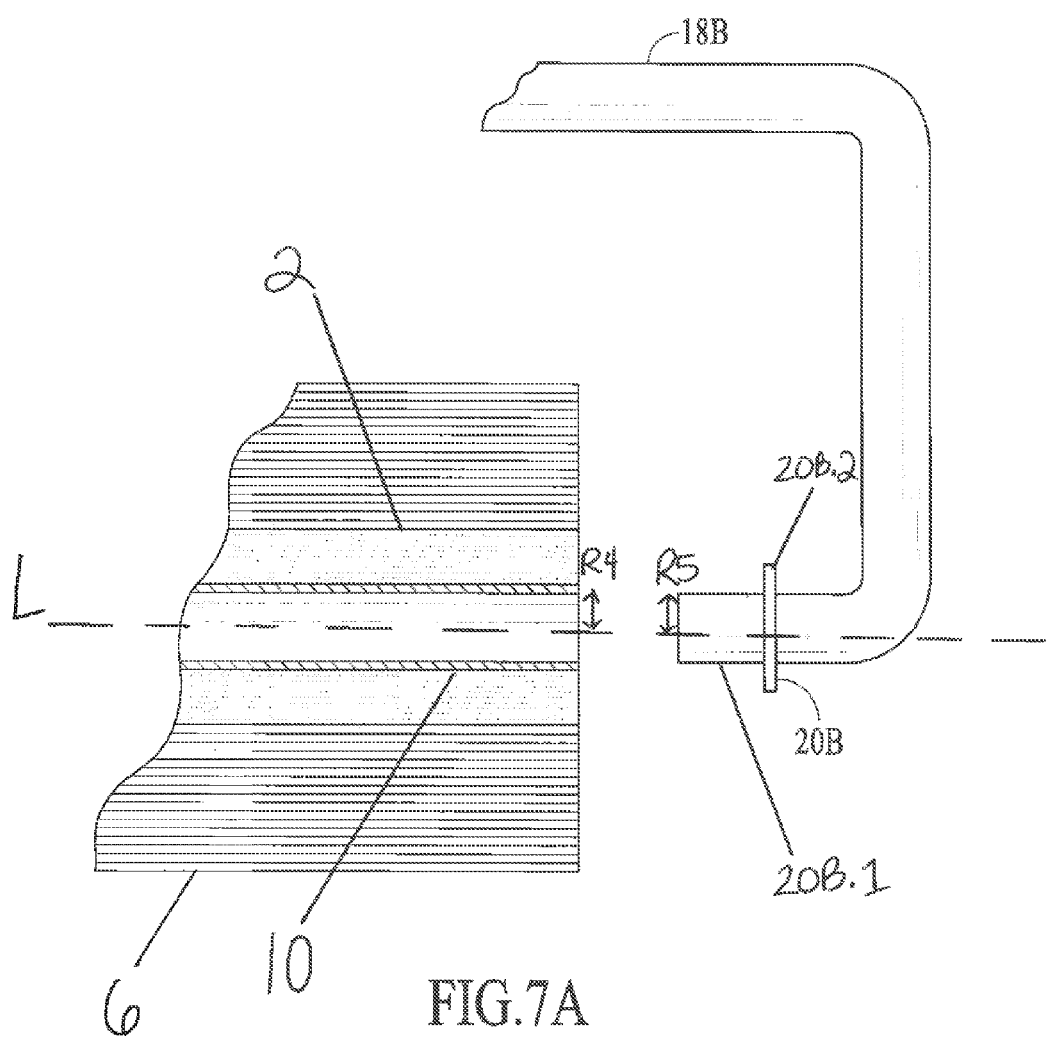
FIG. 7A is a cut-away side view of a first coupling end of the dispenser of FIG. 6A inserted into an inner radius of the rod of FIG. 4 with the rod positioned with the inner channel of the flexible core of FIGS. 1 through 6A.

Referring generally to the Figures and particularly to FIG. 7A, FIG. 7A is a cut-away side view of the second coupling end 20B of the second dispenser arm 18B having a second insertion length 20B.1 and a second insertion plate 20B.2. The second insertion length 20B.1 is shaped to fit into the rod inner radius R4 of the rod 10. The rod inner radius R4 extends at a 90 degree angle from the longitudinal axis L. The second insertion length 20B.1 is shaped as a cylinder having an insertion outer radius R5. The insertion outer radius R5 extends at a 90 degree angle from the longitudinal axis L. The second insertion length 20B.1 may be sized, or slightly oversized by, for example, 0.02 inch, i.e., to present a dimension R5 greater than the magnitude of the rod inner radius R4, and to cause the second coupling end 20B to form a friction fit with the rod 10 and thereby inhibit rotation of the rod 10 about the longitudinal axis L when the flexible core 2 is rotating and a human operator is dispensing the unified sheet 6. Alternatively, the second insertion length 20B.1 may be sized, or slightly undersized by, for example, 0.02 inch, i.e., to have a dimension R5 lesser than the magnitude of the rod inner radius R4, to enable the rod 10 to rotate about the longitudinal axis L when second insertion length 20B.1 is placed within the rod 10 and the flexible core 2 is rotating about the longitudinal axis L while a human operator is dispensing the unified sheet 6.

The second insertion plate 20B.2 is positioned and configured to fit against the flexible core 2 or alternate resilient core 24 when the dispenser 18 is placed in the dispensing position P2 and coupled with the flexible core 2 or alternate resilient core 24. The second insertion plate 20B.2 is further configured to maintain a hermetic seal of pressurized gas G within the inner channel 8 and/or stabilize the flexible core 2 or alternate resilient core 24 along the longitudinal axis L.

Similar to the second coupling end 20B, the first coupling end 20.A includes a cylindrical first insertion length 20A.1 and a first insertion plate 20A.2. The first insertion length 20A.1 may be sized, or slightly oversized by, for example, 0.02 inch, to cause the first coupling end 20A to form a friction fit with the rod 10 and inhibit rotation of the rod 10 about the longitudinal axis L when the flexible core 2 is rotating and a human operator is dispensing the unified sheet 6. Alternatively, the first insertion length 20A.1 may be sized, or slightly undersized by, for example, 0.02 inch, to enable the rod 10 to easily rotate about the longitudinal axis L when the flexible core 2 is rotating about the longitudinal axis L and a human operator is dispensing the unified sheet 6.

The first insertion plate 20A.2 is positioned and configured to fit against the flexible core 2 or alternate resilient core 24 when the dispenser 18 is placed in the dispensing position P2 and coupled with the flexible core 2 or alternate resilient core 24. The first insertion plate 20A.2 is further configured to maintain a hermetic seal of pressurized gas G within the inner channel 8 and/or stabilize the flexible core 2 or alternate resilient core 24 along the longitudinal axis L.

Figure 7B:
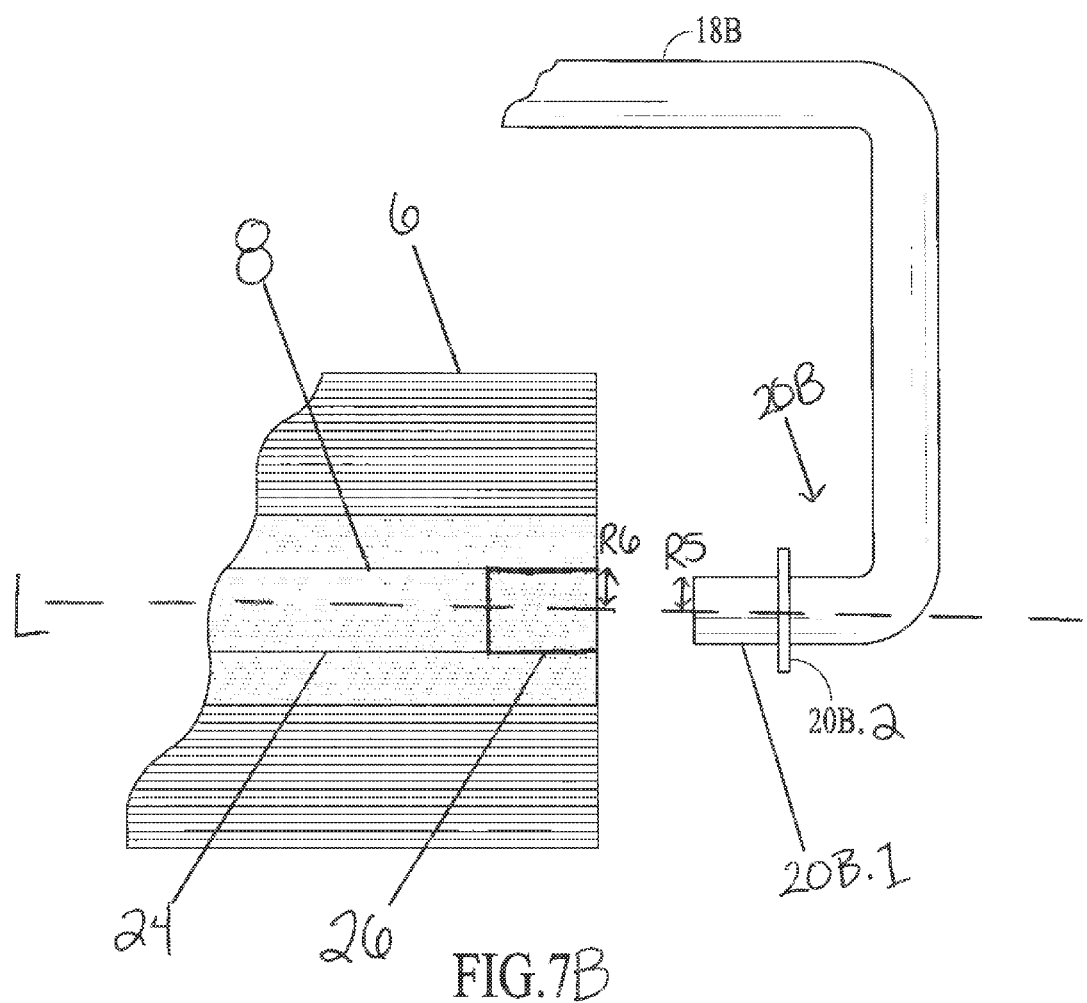
FIG. 7B is a cutaway side view showing a first coupling end of the dispenser of FIG. 6A through 6C engaged with the alternate resilient core of FIG. 6B.

FIG. 7B is a cutaway side view showing the second coupling end 20B of the second arm 18B dispenser 18 engaged with a cylindrical recess 26 of the alternate resilient core 24. The cylindrical recess 26 has an inner recess radius R6 extending 90 degrees from longitudinal axis L. The inner recess radius R6 of the cylindrical recess 26 is shaped and sized to accept insertion of the second insertion length 20B.1 to form a friction fit between the alternate resilient core 24 and the dispenser 18, when the alternate resilient core 24 is placed into the first extended position P1 and the dispenser 18 is placed in the dispensing position P2. The cylindrical recess 26 has an inner radius R6 extending 90 degrees from longitudinal axis L.

As per FIG. 6B, the resilient core 24 further comprises an additional cylindrical recess 28. The alternate cylindrical recess 28 is shaped to accept insertion of the first insertion length 20A.1 of the first arm 18A to form a friction fit between the alternate resilient core 24 and the dispenser 18, when the alternate resilient core 24 is placed into the first extended position P1 and the dispenser 18 is placed in the dispensing position P2. The alternate cylindrical recess 28 presents the inner radius R6 extending 90 degrees from longitudinal axis L.

Figure 7C:
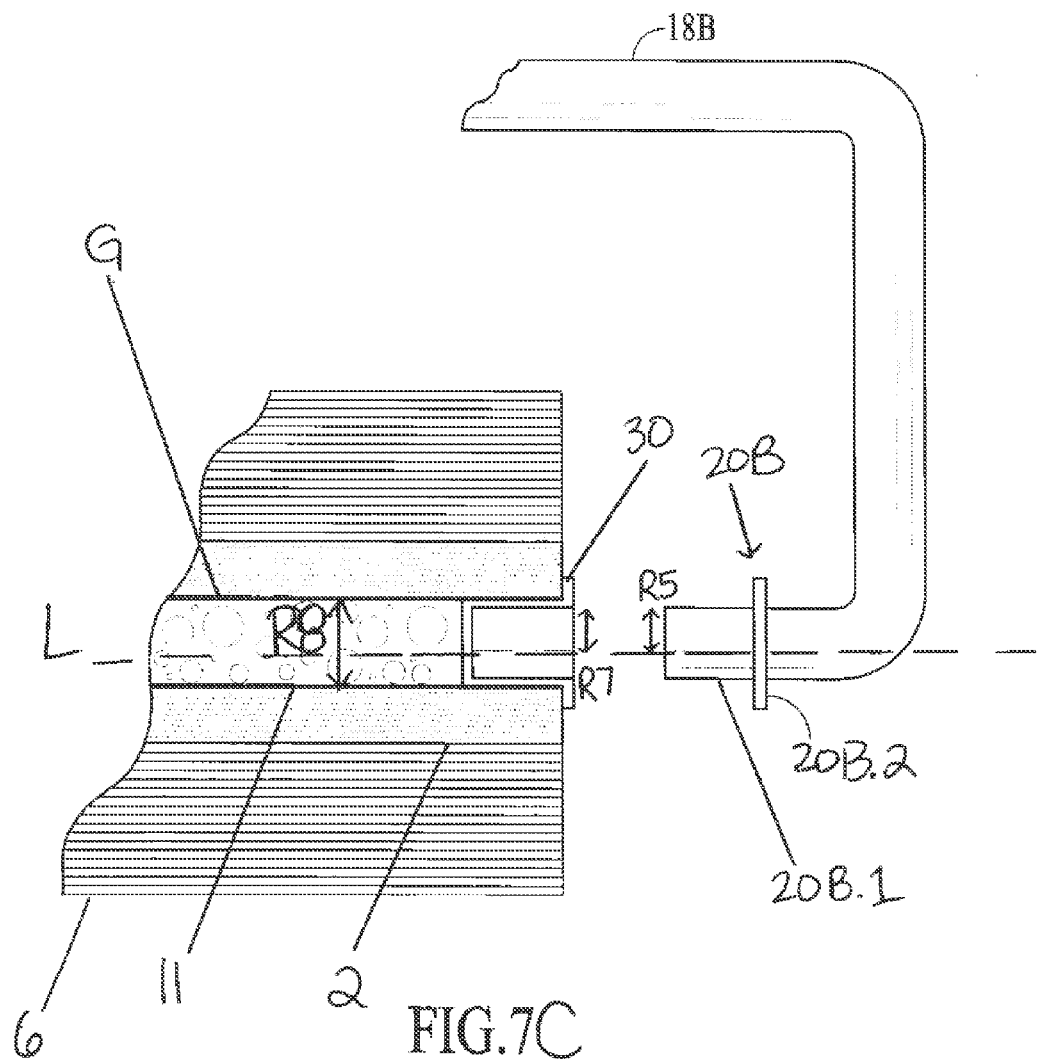
FIG. 7C is a cutaway side view showing a first coupling end of the dispenser of FIG. 6A through 6C engaged with the flexible core of FIGS. 1 through 5B, wherein a gas is maintained under pressure within the inner channel of the flexible core of FIGS. 1 through 5B.

FIG. 7C is a cutaway side view showing the second coupling end 18B of the dispenser 18 engaged with the flexible core 2, wherein the gas G is maintained under pressure within the inner channel 8 of the flexible core 2. A pair of cylindrical plugs 30 present a plug inner radius R6 and a plug outer radius R7. Each plug 30, 30A and 30B may be or comprise organic or synthetic rubber, or other suitable hermetic sealing material known in the art. The plug outer radius R7 is sized or oversized by, for example, 0.02 inch, to form a hermetic seal with the inner channel surface layer 11 and to maintain the gas G under pressure within the inner channel 8. The plug inner radius R6 is sized or undersized by, for example, 0.02 inch, to form a friction fit with either the first insertion length 20A.1 or the second insertion length 20B.1 and to couple the dispenser 18 with the flexible core 2, when the flexible core 2 is in the first extended position P1 and the dispenser 18 is in the dispensing position P2.

Referring generally to the Figures and particularly to FIG. 9, FIG. 9 is a perspective view of a human operator 26 manually positioning the dispenser 18 while coupled with the rod 10 to roll out the sheet 6 away from the core 2. The exemplary sheet 6 may present a width of seven feet, a length of 20 feet. The exemplary sheet 6 preferably presents a thickness of less than 0.02 inches, more preferably presents a thickness of less than 0.10, and even more preferably presents a thickness of less than 0.01 inches. Alternatively, the exemplary sheet 6 preferably may present a thickness of greater than 0.02 inches.

Figure 9A:
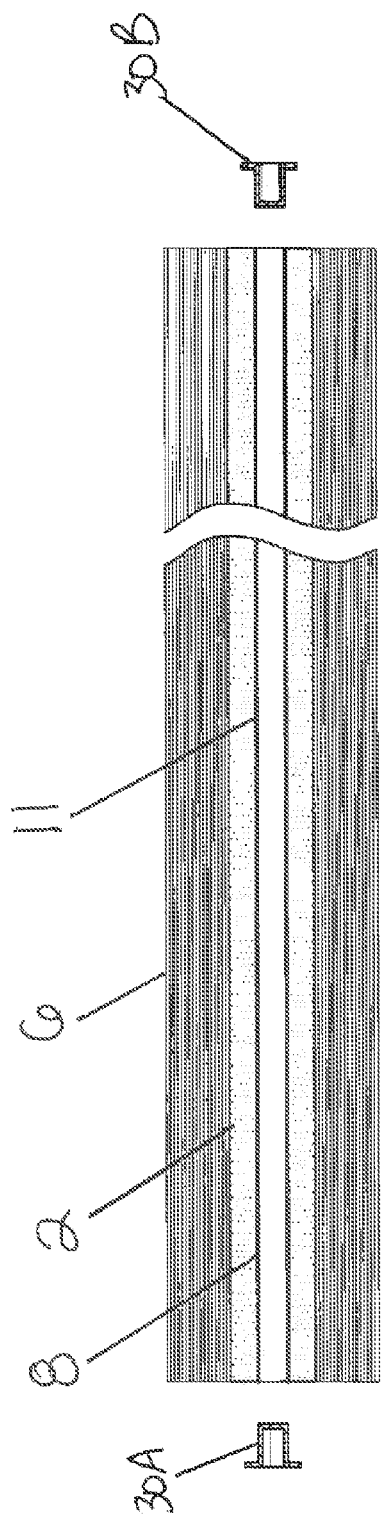
FIG. 9A is a front cut-away representation of the flexible core of FIG. 1 and a pair of hermetically sealing plugs.
Figure 9B:
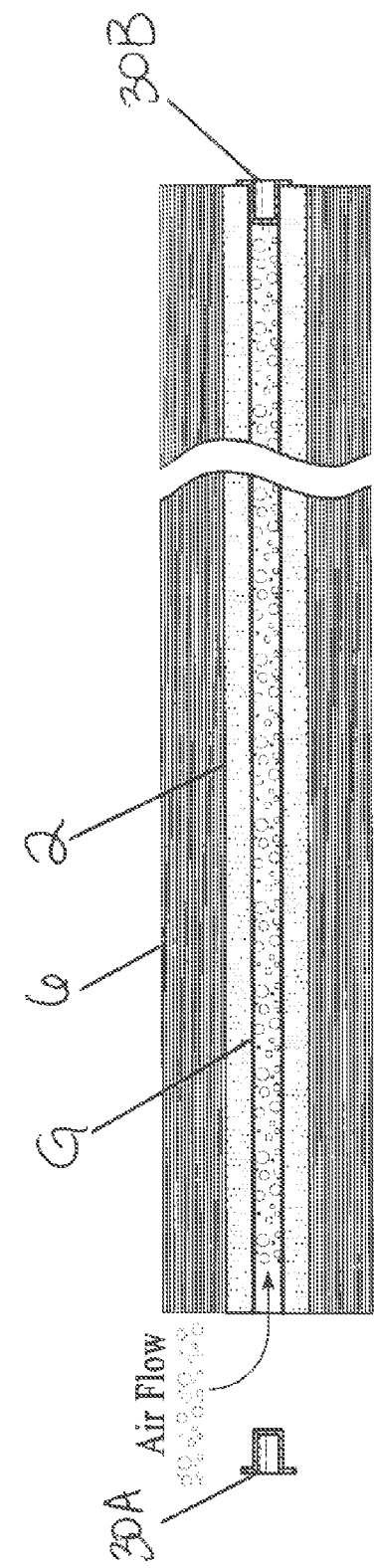
FIG. 9B is a front cut-away representation of the flexible core of FIGS. 1 and 9A and showing a single hermetically sealing plug inserted into the flexible core while gas is blown into the flexible core.

Referring now generally to the Figures and particularly to FIGS. 9A, 9B and 9C, FIG. 9A is a front cut-away representation of the flexible core 2 and a pair of hermetically exemplary sealing plugs 30, namely a first plug 30A and a second plug 30B. The sealing plugs 30A and 30B are sized to partially fit into the inner channel 8 and to maintain the pressurized gas G within the inner channel 8 in combination with the inner surface layer 11. Referring now to FIG. 9B, the first plug 30A is placed within the inner channel 8 to form a hermetic seal while the pressurized gas G is blown into the inner channel 8 under a greater pressure than the ambient air. The pressurized gas G may be blown into the inner channel 8 from human lungs (not shown). Referring now to FIG. 9C, the second plug 30B and the first plug 30A are both placed within the inner channel 8 to form a hermetic seal and maintain the pressurized gas G within the inner channel 8. The core 2 and the sheet 6 may then be folded into the first folded position S1, the second folded position S2, or another folded position, and stored or shipped.

Figure 10A:
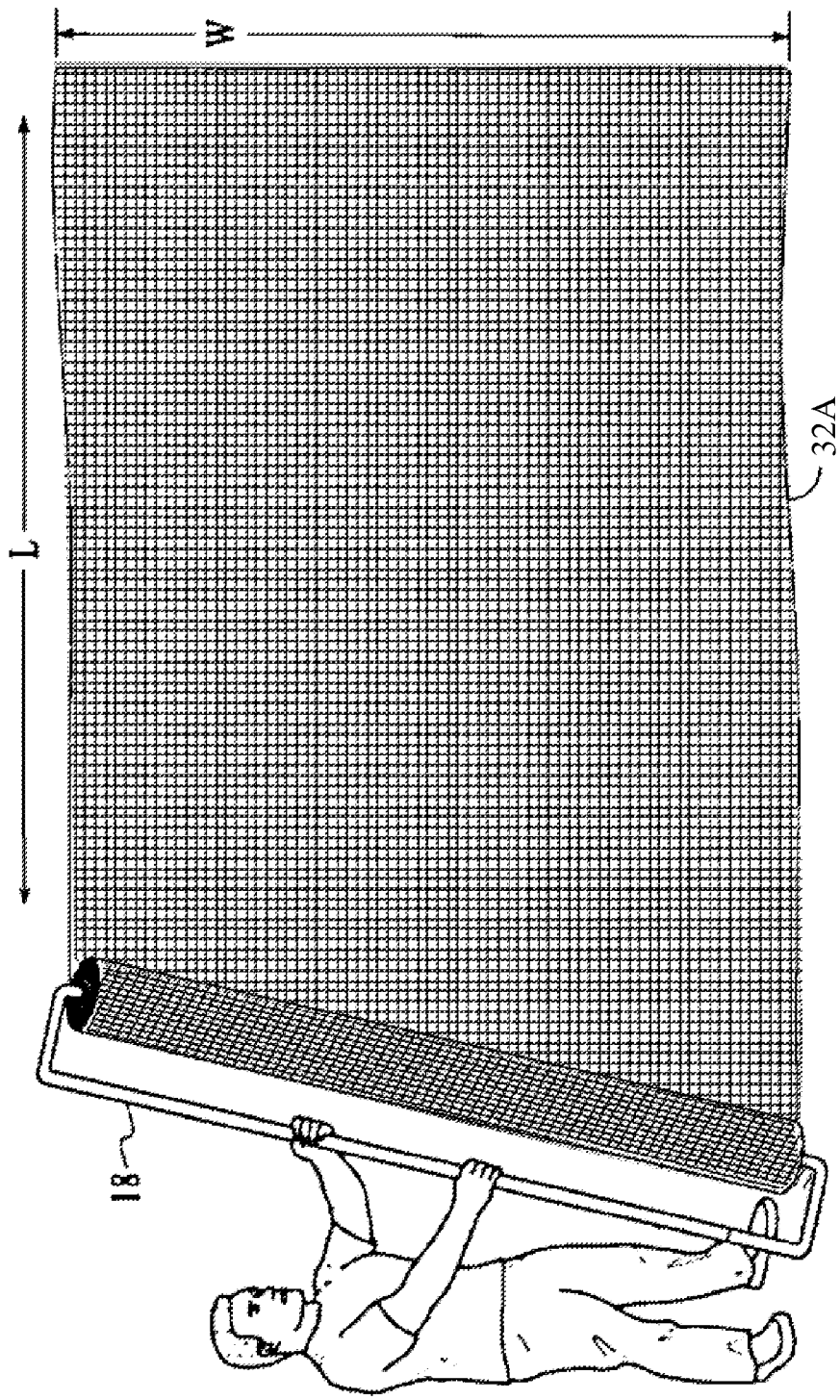
FIG. 10A presents a sheet of netting material coupled with and extending from the flexible core of FIG. 1.

Referring now generally to the Figures and particularly to FIG. 10A, FIG. 10A presents a sheet of netting material 32A coupled with and extending from the flexible core 2.

Figure 10B:
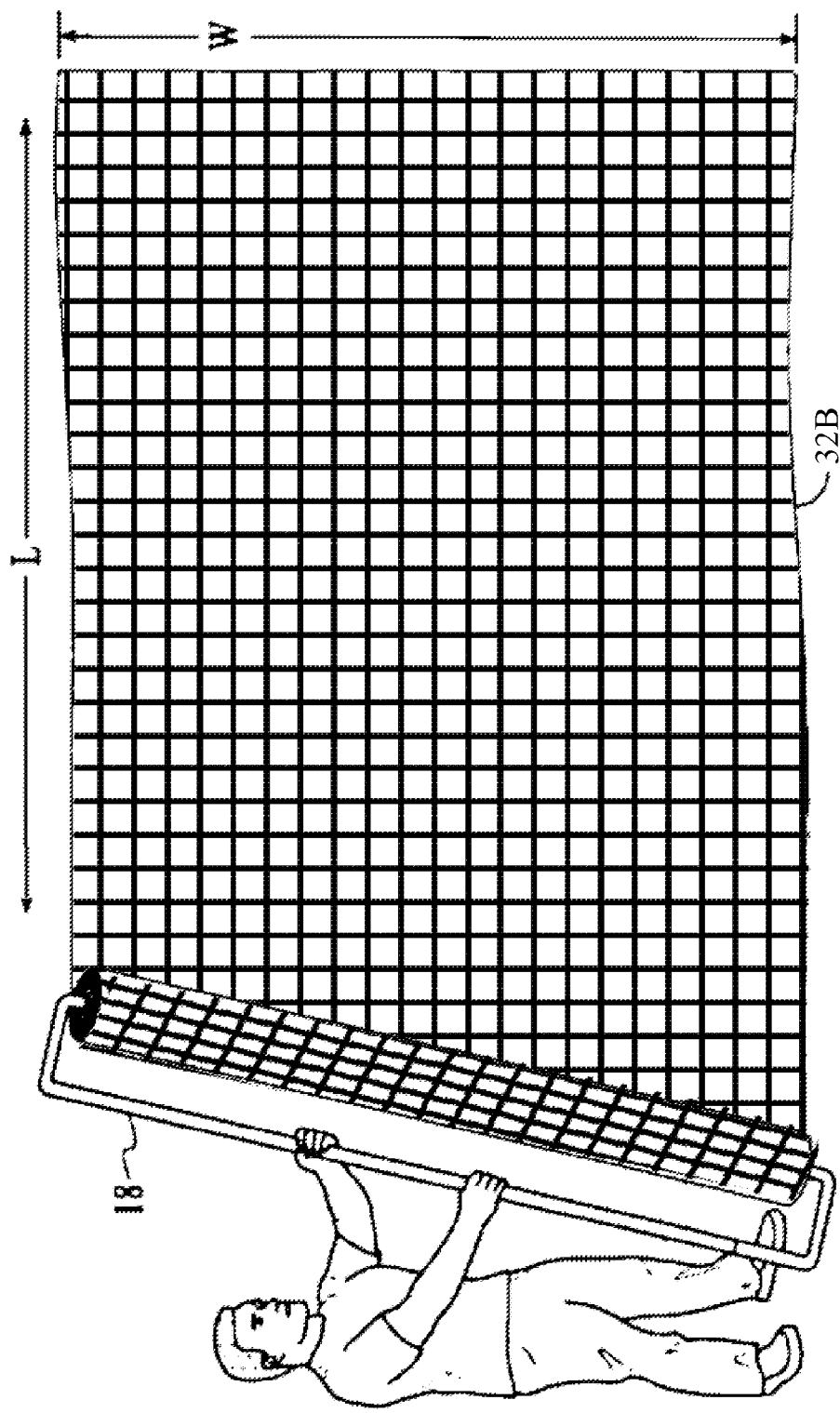
FIG. 10B presents a sheet of deer netting material coupled with and extending from the flexible core of FIG. 1.

Referring now generally to the Figures and particularly to FIG. 10B, FIG. 10B presents a sheet of deer netting material 32B coupled with and extending from the flexible core 2.

Figure 10C:
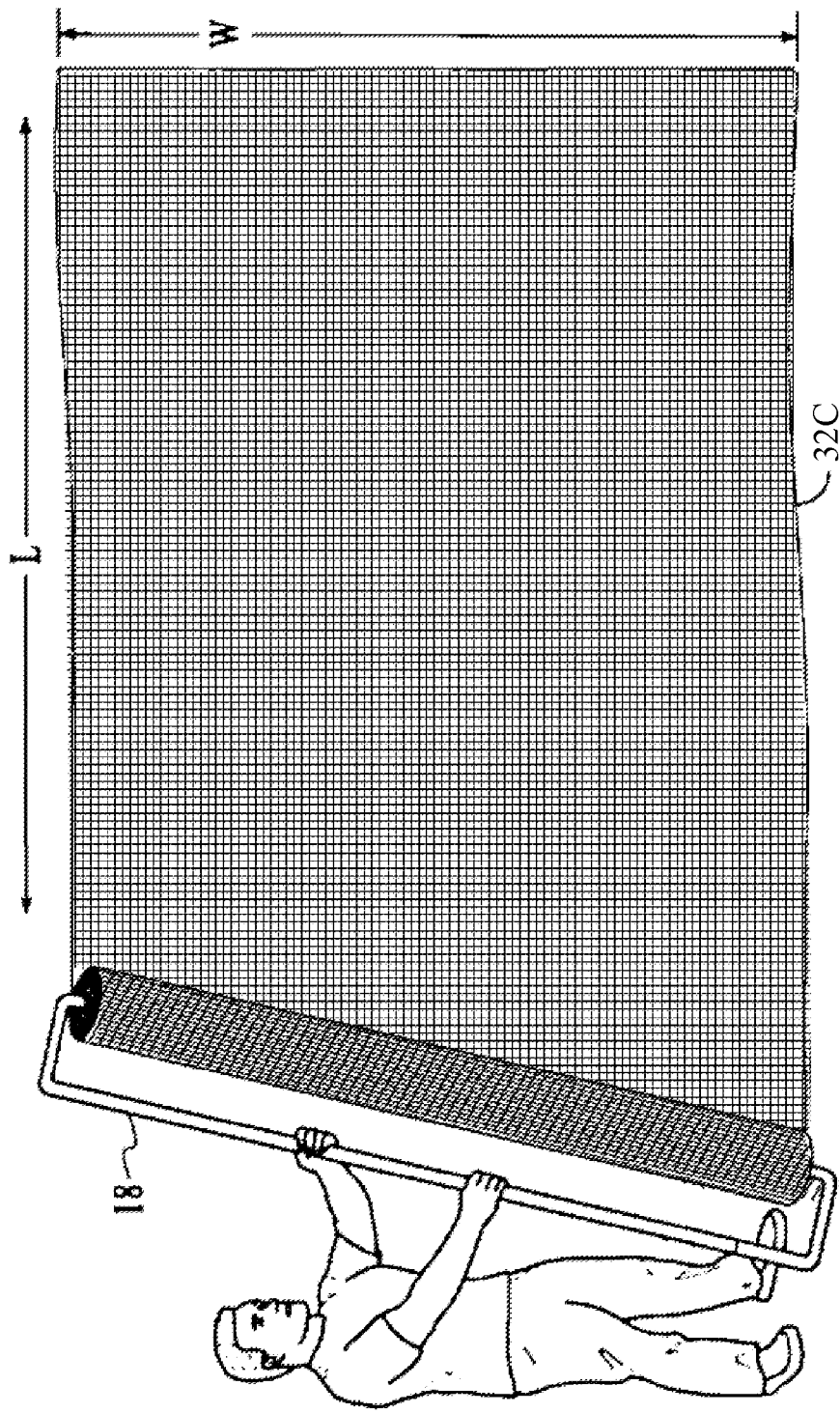
FIG. 10C presents a sheet of a plant protection material coupled with and extending from the flexible core of FIG. 1.

Referring now generally to the Figures and particularly to FIG. 10C, FIG. 10C presents a sheet of plant protection material 32C coupled with and extending from the flexible core 2.

Figure 10D:
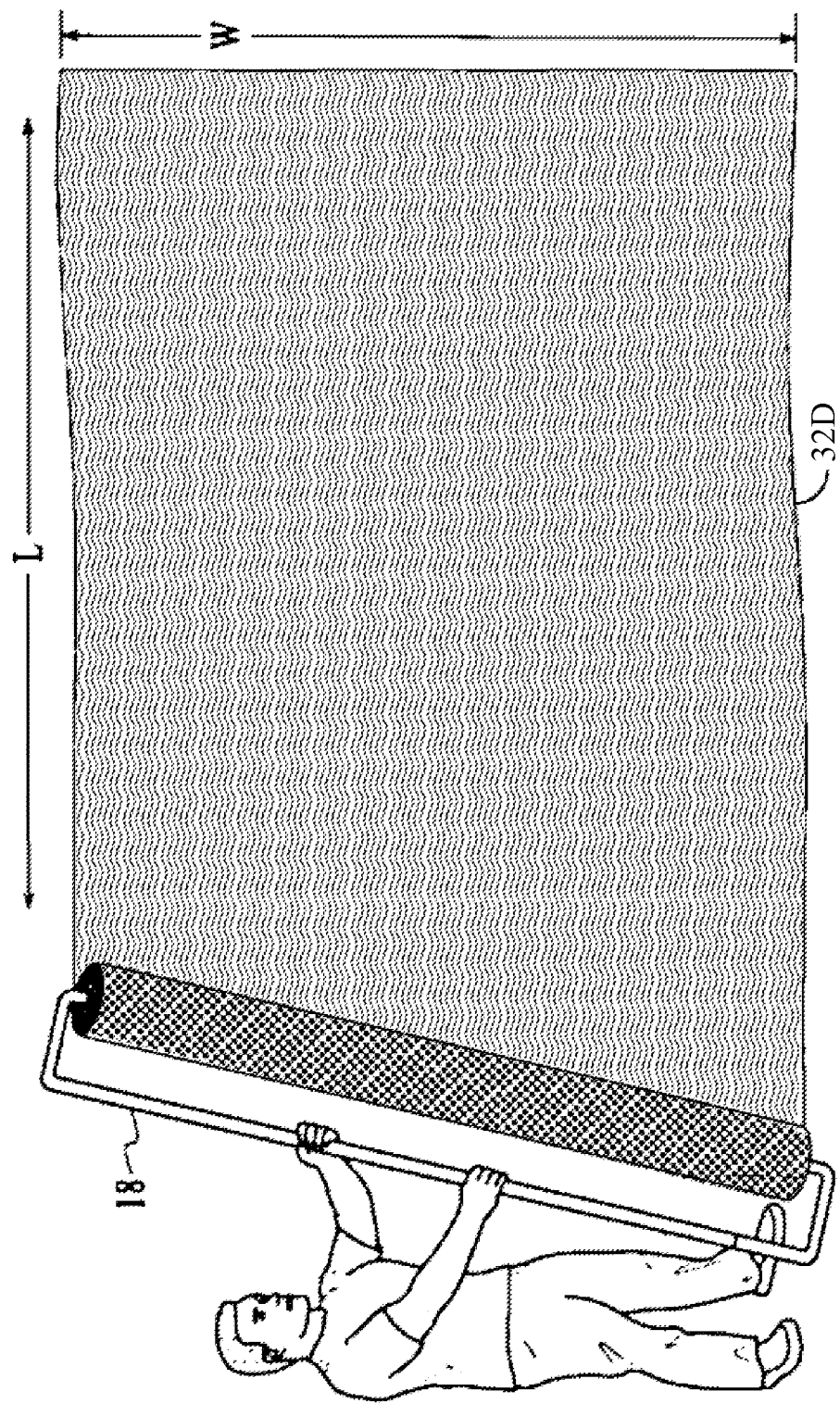
FIG. 10D presents a sheet of a fabric material coupled with and extending from the flexible core of FIG. 1.

Referring now generally to the Figures and particularly to FIG. 10D, FIG. 10D presents a sheet of fabric material 32D coupled with and extending from the flexible core 2.

Figure 10E:
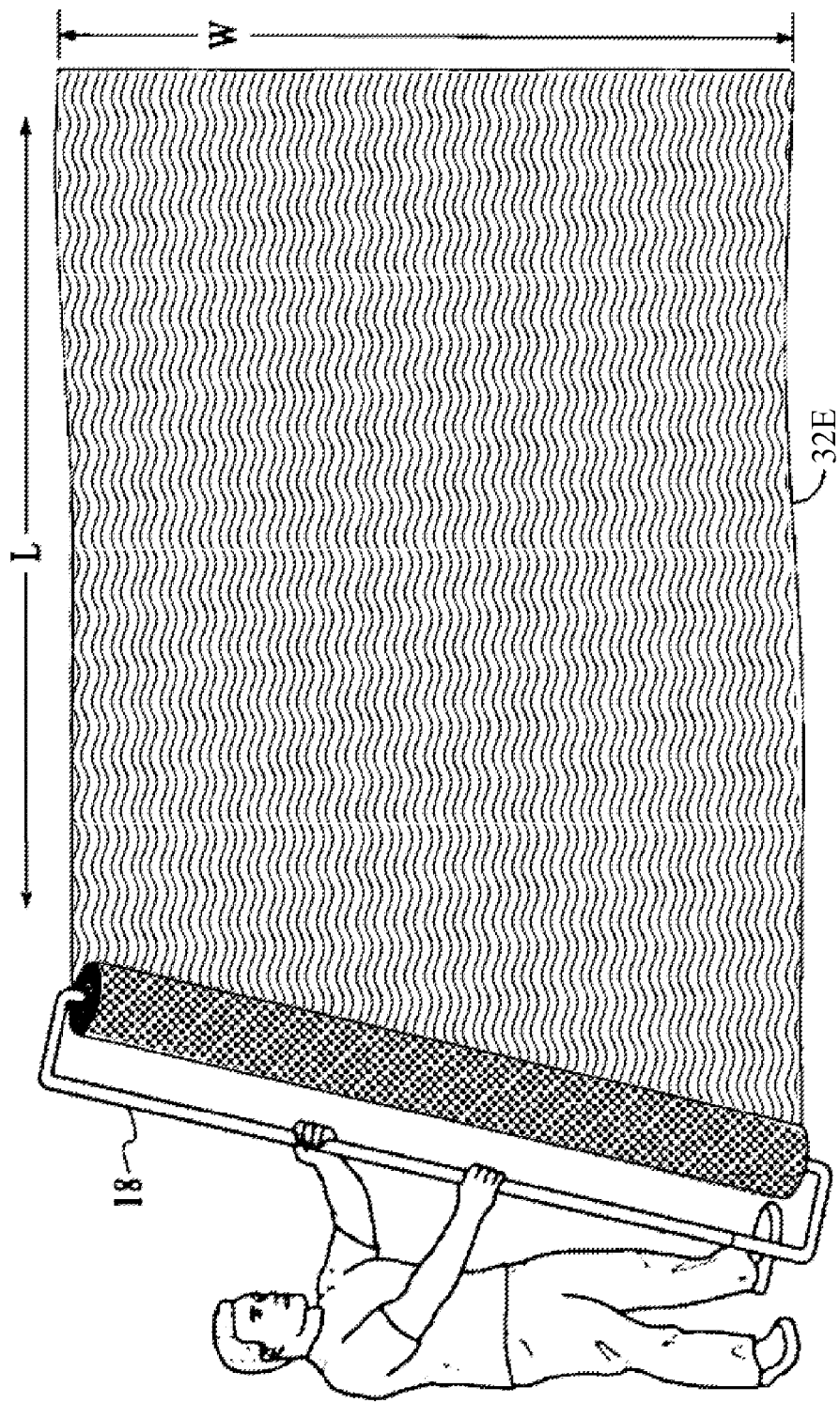
FIG. 10E presents a sheet of a textile material coupled with and extending from the flexible core of FIG. 1.

Referring now generally to the Figures and particularly to FIG. 10E, FIG. 10E presents a sheet of textile material 32E coupled with and extending from the flexible core 2.

Figure 10F:
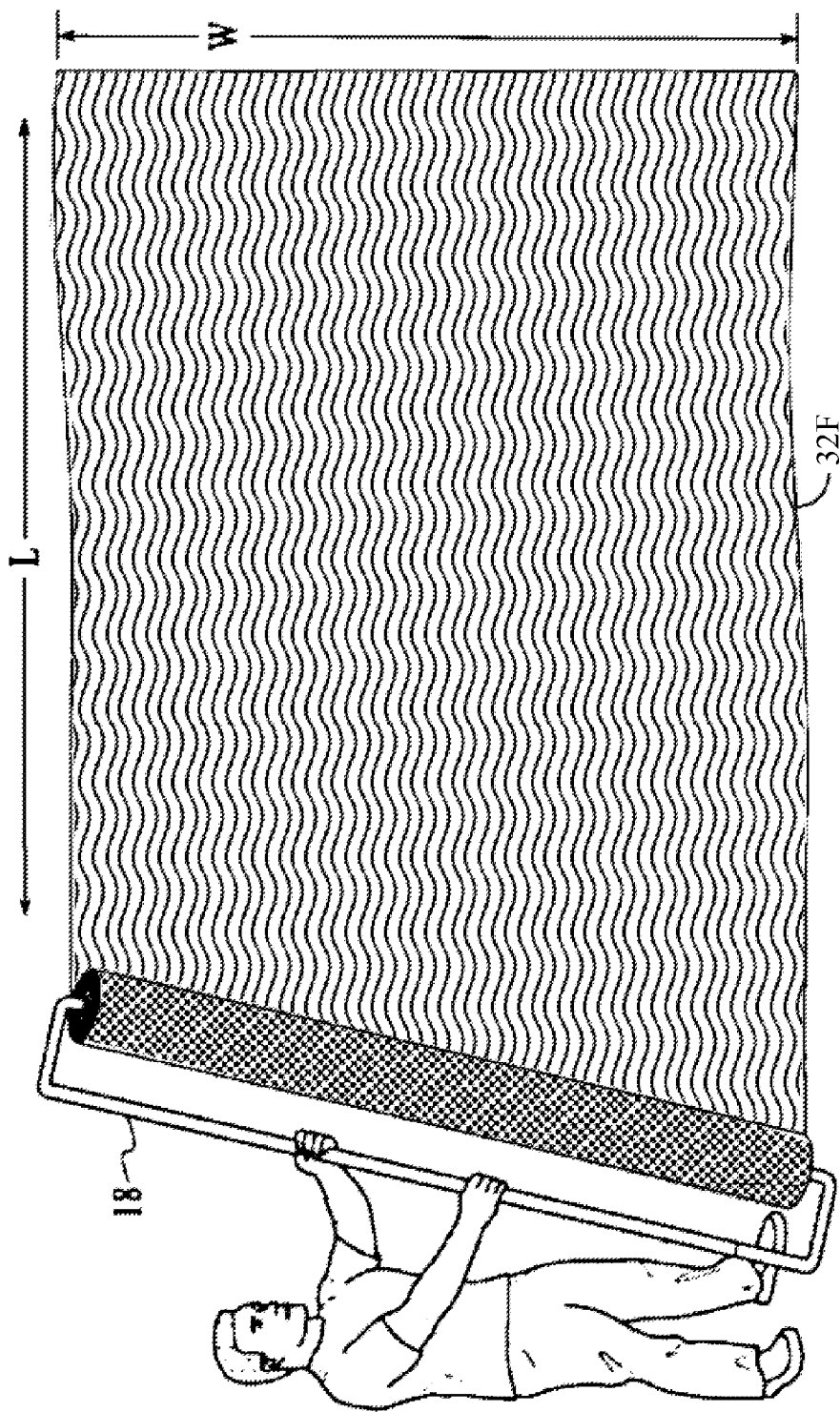
FIG. 10F presents a sheet of a cloth material coupled with and extending from the flexible core of FIG. 1.

Referring now generally to the Figures and particularly to FIG. 10F, FIG. 10F presents a sheet of cloth material 32F coupled with and extending from the flexible core 2.

Figure 10G:
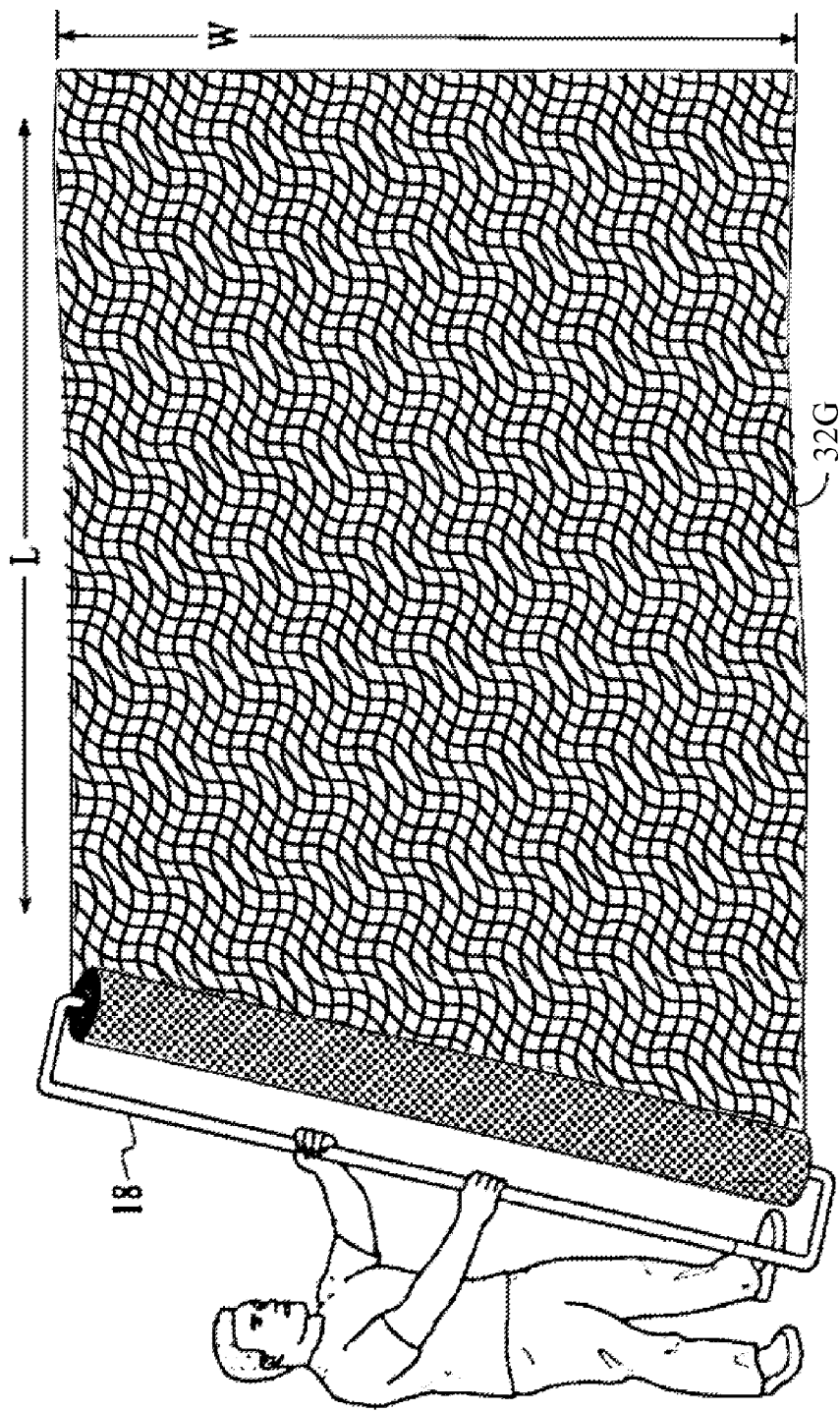
FIG. 10G presents a sheet of a tarpaulin material coupled with and extending from the flexible core of FIG. 1.

Referring now generally to the Figures and particularly to FIG. 10G, FIG. 10G presents a sheet of tarpaulin material 32G coupled with and extending from the flexible core 2.

Figure 10H:
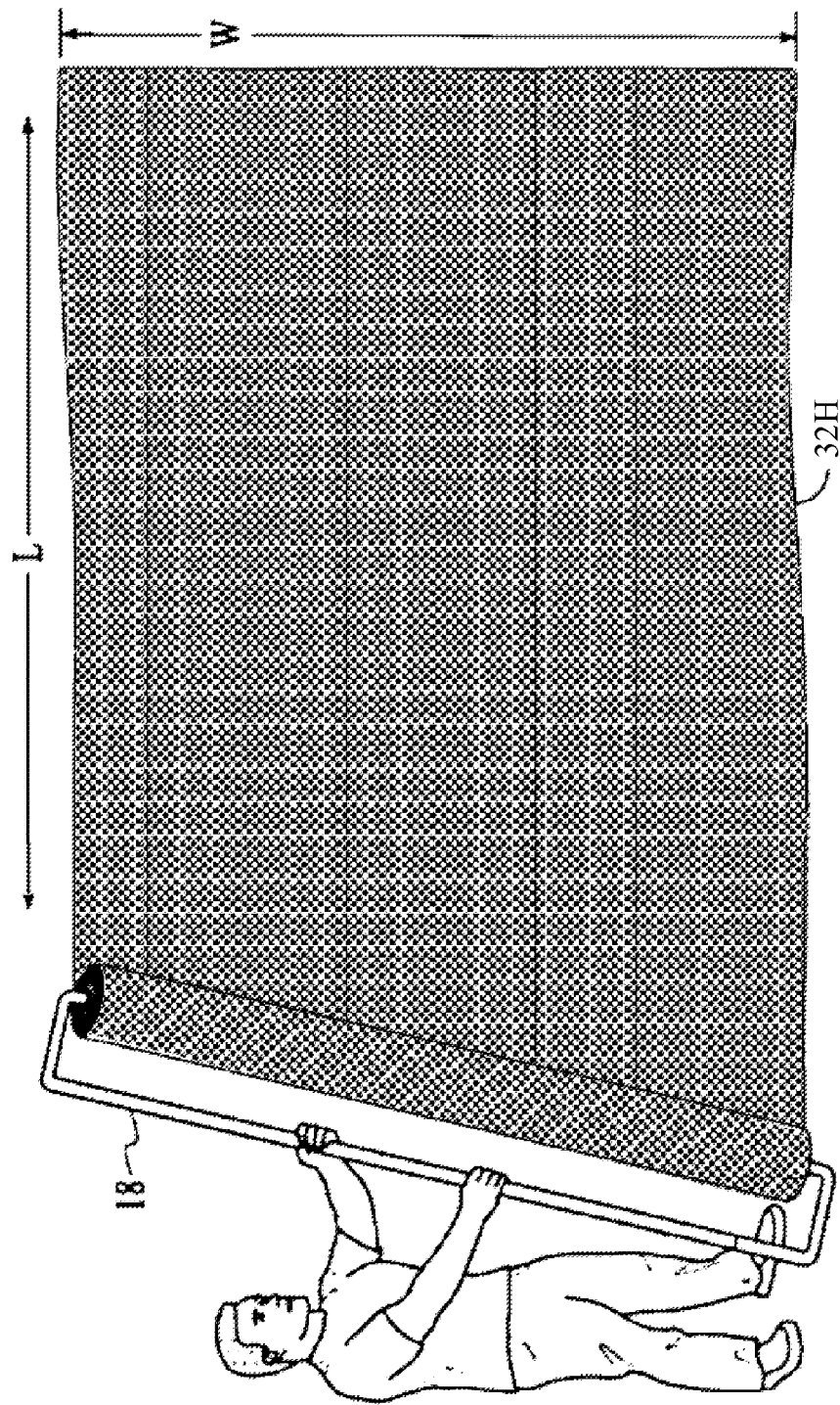
FIG. 10H presents a sheet of a canvas material coupled with and extending from the flexible core of FIG. 1.

Referring now generally to the Figures and particularly to FIG. 10H, FIG. 10H presents a sheet of canvas material 32H coupled with and extending from the flexible core 2.

Figure 10I:
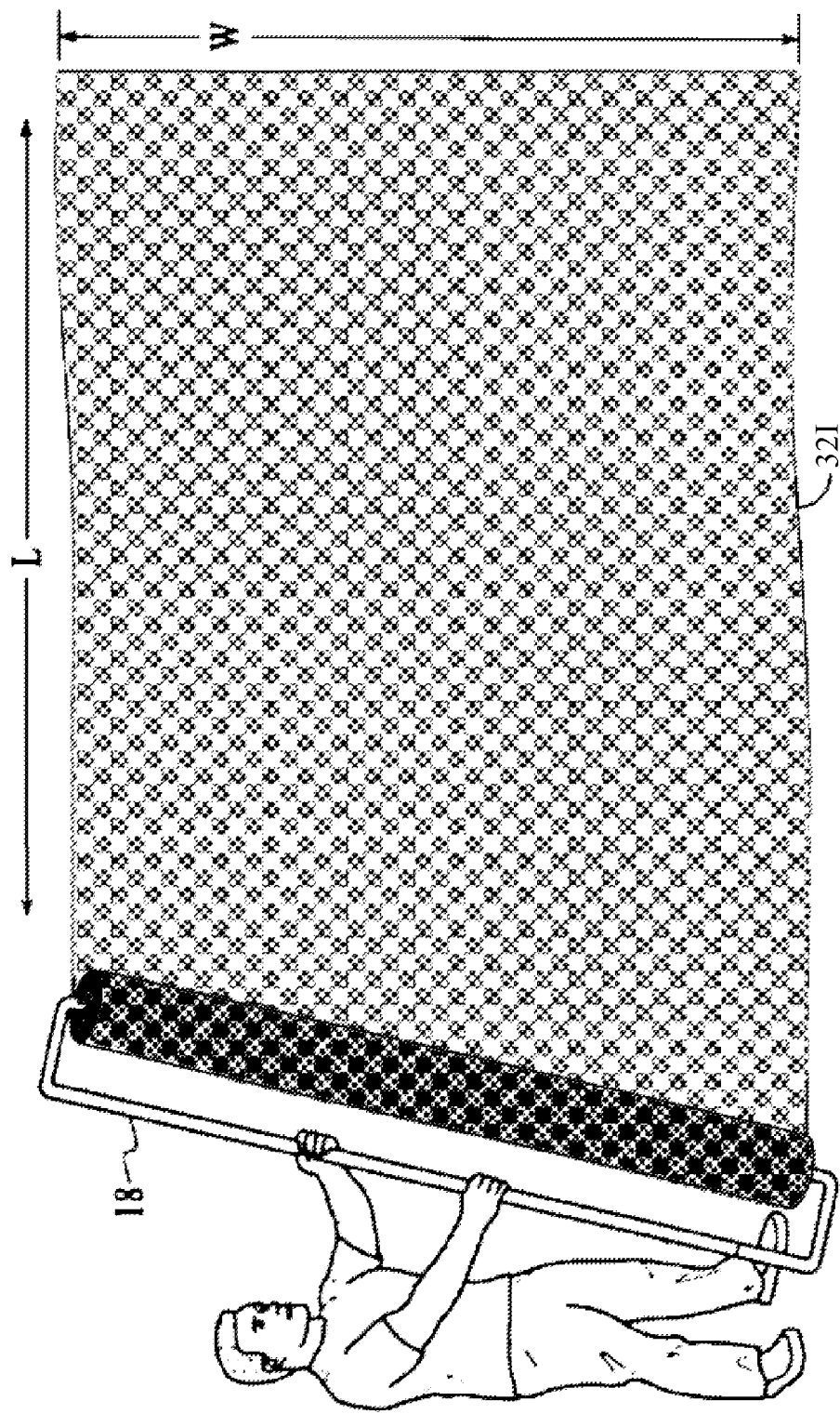
FIG. 10I presents a sheet of a flexible solar energy conversion circuitry panel material coupled with and extending from the flexible core of FIG. 1.

Referring now generally to the Figures and particularly to FIG. 10I, FIG. 10I presents a sheet of flexible solar energy conversion circuitry panel material 32I coupled with and extending from the flexible core 2.

Figure 10J:
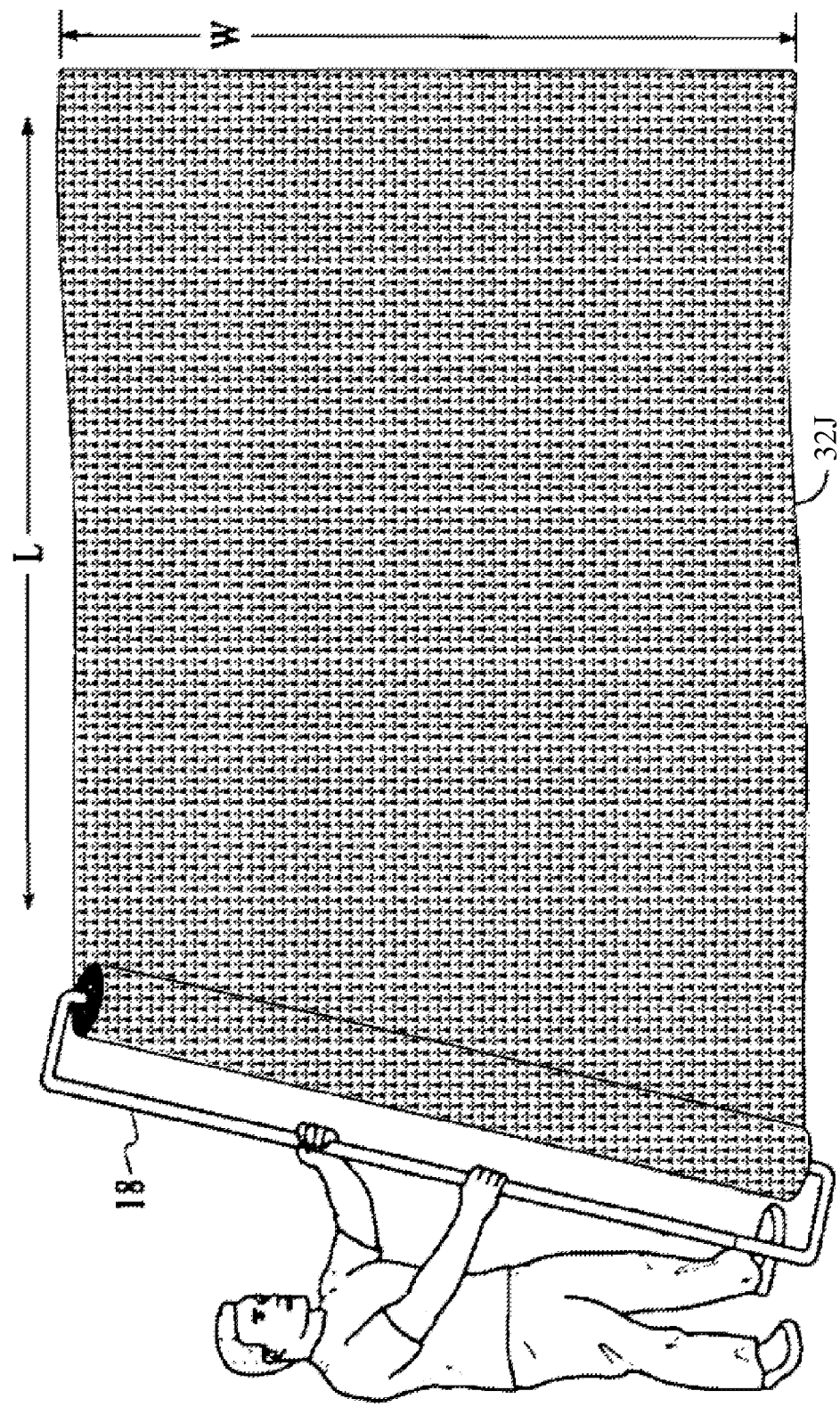
FIG. 10J presents a sheet of a metallic threaded fabric material coupled with and extending from the flexible core of FIG. 1.

Referring now generally to the Figures and particularly to FIG. 10J, FIG. 10J presents a sheet of metallic threaded fabric material 32J coupled with and extending from the flexible core 2.

Figure 10K:
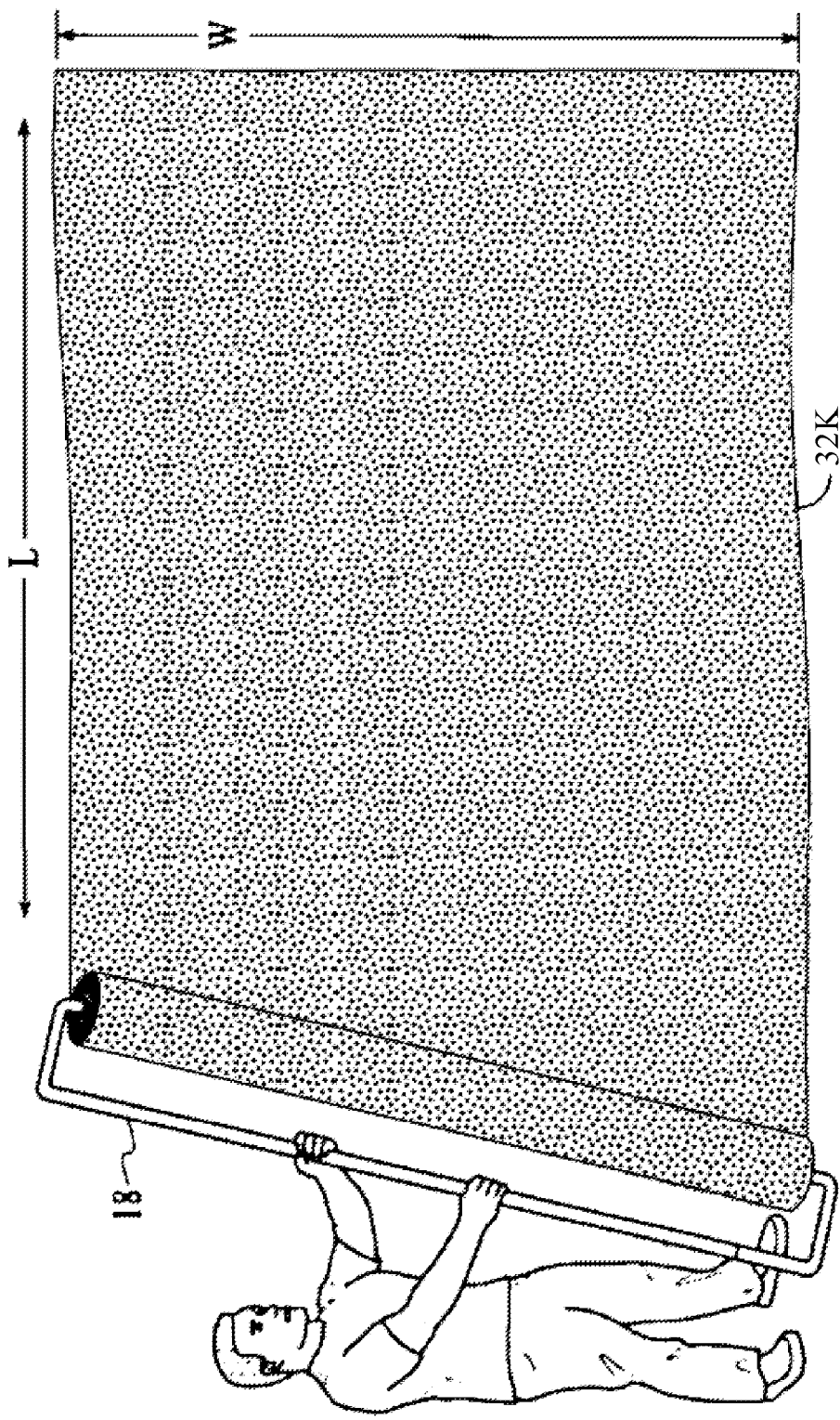
FIG. 10K presents a sheet of an aramid fiber sheet material coupled with and extending from the flexible core of FIG. 1.

Referring now generally to the Figures and particularly to FIG. 10K, FIG. 10K presents a sheet of aramid fiber sheet material 32K coupled with and extending from the flexible core 2.

Figure 10L:
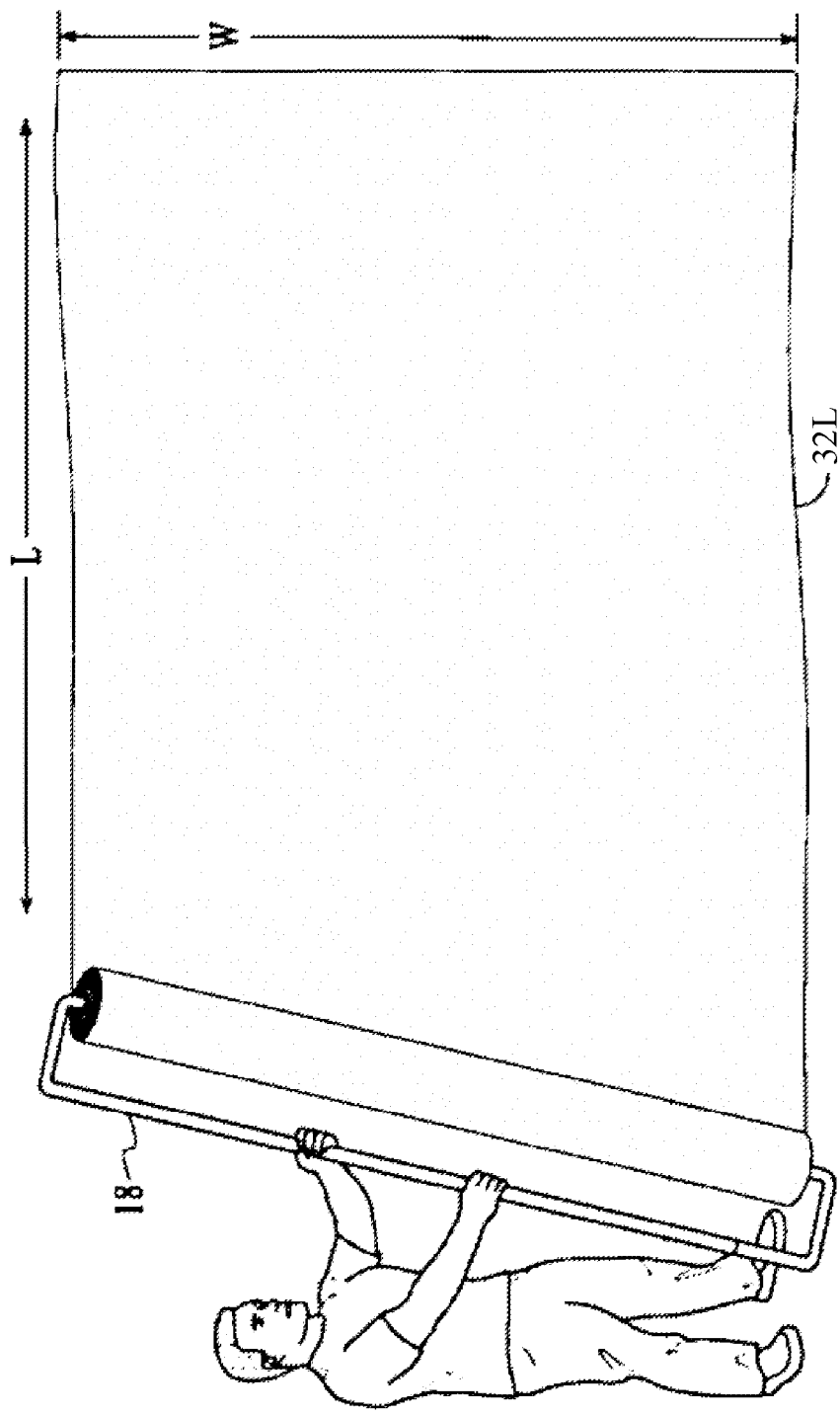
FIG. 10L presents a sheet of a polyester film material coupled with and extending from the flexible core of FIG. 1.

Referring now generally to the Figures and particularly to FIG. 10L, FIG. 10L presents a sheet of polyester film material 32L coupled with and extending from the flexible core 2.

Figure 10M:
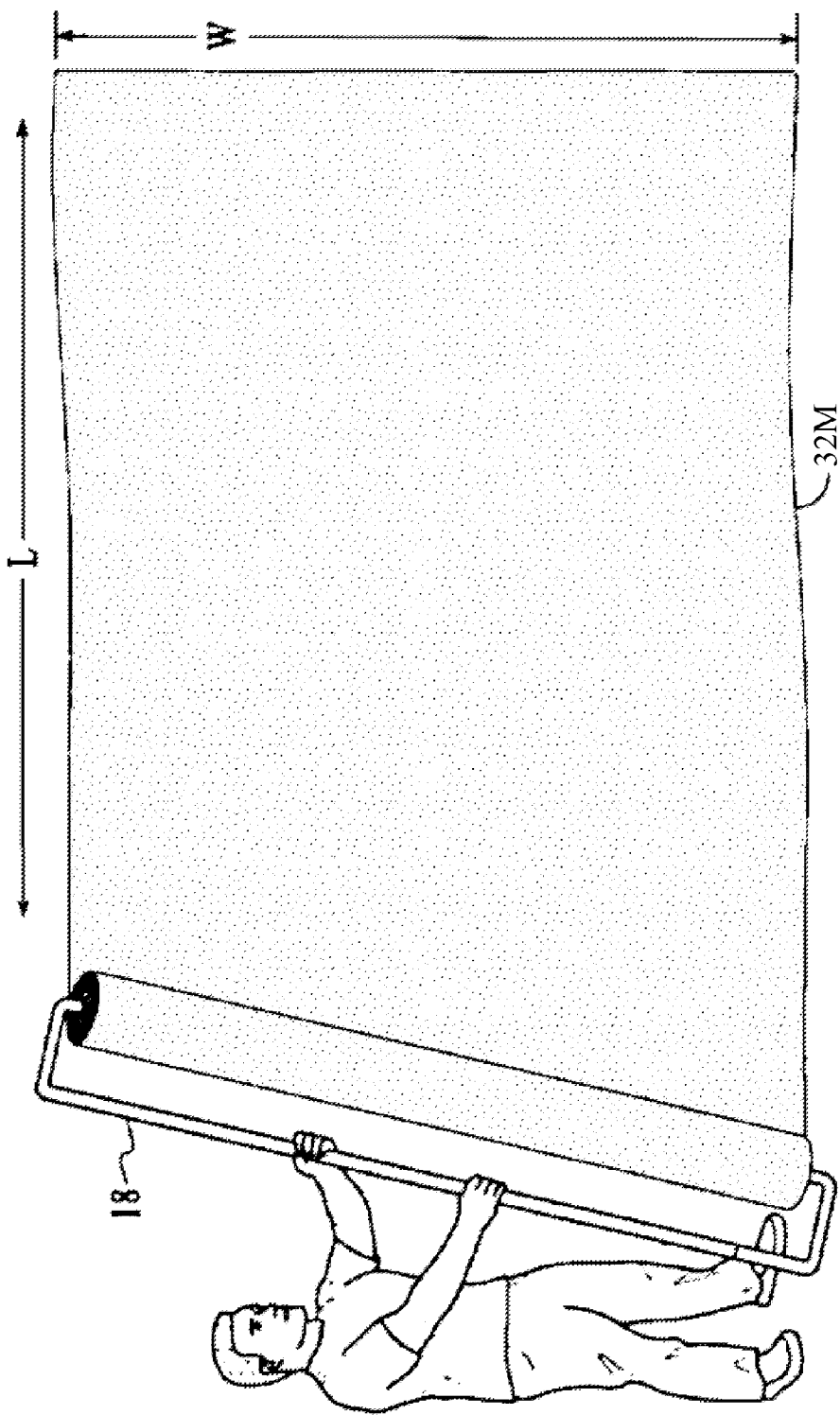
FIG. 10M presents a sheet of an elastomer sheet material coupled with and extending from the flexible core of FIG. 1.

Referring now generally to the Figures and particularly to FIG. 10M, FIG. 10M presents a sheet of elastomer sheet material 32M coupled with and extending from the flexible core 2.

Figure 10N:
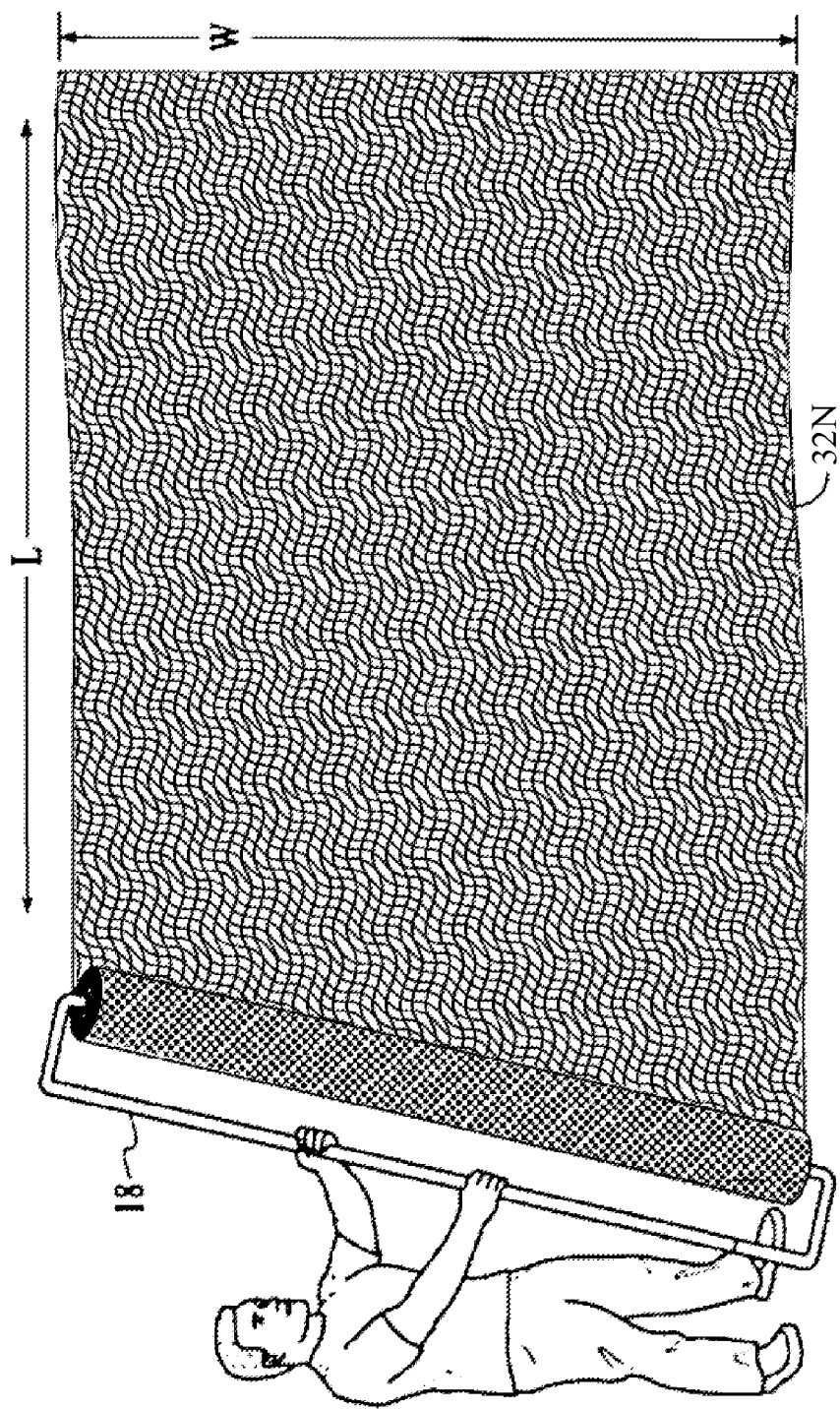
FIG. 10N presents a sheet of an elastomer netting material coupled with and extending from the flexible core of FIG. 1.

Referring now generally to the Figures and particularly to FIG. 10N, FIG. 10N presents a sheet of elastomer netting material 32N coupled with and extending from the flexible core 2.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

What is claimed is:

1. A device for packaging a sheet of material, the device configured to allow for dispensing of the sheet material, the device comprising:
    a flexible tubular cylinder, having an internal channel and an external curved surface, the internal channel having an elongate length disposed between a first end and a second end; and
    a flexible sheet, the flexible sheet wrapped about the external curved surface of the flexible tubular cylinder;
    the flexible tubular cylinder and flexible sheet being folded such that a first portion of the flexible tubular cylinder is bent over a second portion of the flexible tubular cylinder such that the first portion covers at least part of the second portion.

2. The device of claim 1, wherein the flexible sheet is selected from the materials group consisting of a netting a deer netting, a plant protection sheet, a fabric, a textile, a cloth, a tarpaulin, a canvas, a flexible solar energy conversion circuitry panel, a metallic threaded fabric, an aramid fiber sheet, polyester film, an elastomer sheet, and an elastomer netting.

3. The device of claim 1, further comprising one or more restraints removably coupled with the flexible sheet for maintaining the flexible sheet wrapped about the external curved surface of the flexible tubular cylinder.

4. The device of claim 1, further comprising a restraining element, wherein the flexible cylinder is maintained by the restraining element in a folded position for shipment or storage.

5. A device comprising:
    a flexible cylinder having an external curved surface extending along an elongate length between a first end and a second end; and
    a flexible sheet, the flexible sheet wrapped about the external curved surface of the flexible cylinder;
    the flexible cylinder and flexible sheet being folded such that a first portion of the flexible cylinder is bent over a second portion of the flexible cylinder such that the first portion covers at least part of the second portion.

6. The device of claim 5, wherein the flexible sheet is selected from the materials group consisting of a netting, a deer netting, a plant protection sheet, a fabric, a textile, a cloth, a tarpaulin, a canvas, a flexible solar energy conversion circuitry panel, a metallic threaded fabric, an aramid fiber sheet, polyester film, an elastomer sheet, and an elastomer netting.

7. The device of claim 5, further comprising one or more restraints removably coupled with the flexible sheet for maintaining the flexible sheet wrapped about the external curved surface of the flexible cylinder.

8. The device of claim 7, further comprising a restraining element, wherein the flexible cylinder is maintained by the restraining element in a folded position for shipment or storage.

9. The device of claim 8, further comprising a dispenser, the dispenser coupled with the flexible cylinder, whereby the dispenser enables manual deployment of the sheet from the flexible cylinder.

10. The device of claim 9, wherein the dispenser is rotatably coupled with the flexible cylinder.

11. The device of claim 5, wherein the flexible cylinder is folded, whereby the device presents a reduced total length along a cylindrical axis of the flexible cylinder.

12. A method comprising:
positioning a rigid rod inside an internal channel of a flexible tubular cylinder having a first end maximally displaced from a second end;
wrapping a sheet of material around an external circular surface of the flexible tubular cylinder;
removing the rigid rod from the internal channel of the flexible tubular cylinder; and
folding the cylinder, whereby an axial length of the flexible tubular cylinder is reduced and the first end is positioned more proximate to the second end.

13. The method of claim 12, further comprising restraining the folded flexible tubular cylinder for shipment or storage.

14. The method of claim 13, further comprising:
unrestraining the folded flexible tubular cylinder;
returning the flexible cylinder to a fully extended state;
inserting the rigid rod into the internal channel of the flexible tubular cylinder; and
unwrapping the sheet of material from the flexible tubular cylinder.

15. A method comprising:
wrapping a sheet of material around an external circular surface of a flexible cylinder, and
folding the cylinder such that a first portion of the cylinder is bent over a second portion of the cylinder such that the first portion covers at least part of the second portion.

16. The method of claim 15, further comprising restraining the folded cylinder for shipment or storage.

17. The method of claim 16, further comprising:
unrestraining the flexible cylinder;
returning the flexible cylinder to a fully extended state; and
unwrapping the sheet of material from the flexible cylinder.

* * * * *